US010998600B2

(12) United States Patent
Kawai et al.

(10) Patent No.: US 10,998,600 B2
(45) Date of Patent: May 4, 2021

(54) LAMINATED SECONDARY BATTERY AND MANUFACTURING METHOD OF THE SAME, AND DEVICE

(71) Applicant: Murata Manufacturing Co., Ltd., Nagaokakyo (JP)

(72) Inventors: Toru Kawai, Nagaokakyo (JP); Masahiro Otsuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 32 days.

(21) Appl. No.: 16/416,567

(22) Filed: May 20, 2019

(65) Prior Publication Data

US 2019/0273237 A1 Sep. 5, 2019

Related U.S. Application Data

(63) Continuation of application No. PCT/JP2017/037242, filed on Oct. 13, 2017.

(30) Foreign Application Priority Data

Jan. 26, 2017 (JP) .............................. JP2017-011977

(51) Int. Cl.
*H01M 4/13* (2010.01)
*H01M 50/46* (2021.01)
(Continued)

(52) U.S. Cl.
CPC ............. *H01M 50/46* (2021.01); *H01M 4/02* (2013.01); *H01M 4/13* (2013.01); *H01M 10/04* (2013.01);
(Continued)

(58) Field of Classification Search
CPC .... H01M 50/46; H01M 50/531; H01M 50/10; H01M 4/02; H01M 4/13; H01M 10/04;
(Continued)

(56) References Cited

U.S. PATENT DOCUMENTS 6,946,220 B2 9/2005 Probst et al.
7,035,078 B1 * 4/2006 Viavattine ............. H01M 50/54
361/303

(Continued)

FOREIGN PATENT DOCUMENTS

JP H0864479 A 3/1996
JP 2003217601 A 7/2003
(Continued)

OTHER PUBLICATIONS

International Search Report issued in PCT/JP2017/037242, dated Dec. 5, 2017.
(Continued)

*Primary Examiner* — Raymond Alejandro
(74) *Attorney, Agent, or Firm* — Arent Fox LLP

(57) ABSTRACT

A laminated secondary battery that houses an electrode assembly and an electrolyte in an exterior body. In the electrode assembly, a positive and negative electrode laminate body including an electrode current collector and
(Continued)

electrode multi-units having two or more electrode material layers formed on the electrode current collector with non-forming regions interposed between them is bent on the non-forming regions.

14 Claims, 10 Drawing Sheets

(51) Int. Cl.
- *H01M 10/04* (2006.01)
- *H01M 10/058* (2010.01)
- *H01M 10/0525* (2010.01)
- *H01M 4/02* (2006.01)
- *H01M 10/0583* (2010.01)
- *H01M 50/10* (2021.01)
- *H01M 50/531* (2021.01)

(52) U.S. Cl.
CPC ..... *H01M 10/0418* (2013.01); *H01M 10/058* (2013.01); *H01M 10/0525* (2013.01); *H01M 10/0583* (2013.01); *H01M 50/10* (2021.01); *H01M 50/531* (2021.01); *H01M 2250/30* (2013.01); *Y02E 60/10* (2013.01); *Y02T 10/70* (2013.01)

(58) Field of Classification Search
CPC ......... H01M 10/0418; H01M 10/0525; H01M 10/052; H01M 10/058; H01M 10/0583; H01M 2250/30; Y02E 60/10; Y02T 10/70
See application file for complete search history.

(56) References Cited

U.S. PATENT DOCUMENTS

| | | | |
|---|---|---|---|
| 8,440,356 B2* | 5/2013 | Kim | H01M 10/045 429/246 |
| 8,945,744 B2 | 2/2015 | Kwon et al. | |
| 9,741,974 B2 | 8/2017 | Kwon et al. | |
| 2003/0077509 A1 | 4/2003 | Probst et al. | |
| 2014/0099525 A1 | 4/2014 | Kwon et al. | |
| 2014/0170471 A1* | 6/2014 | Kanemoto | H01M 4/80 429/164 |
| 2016/0020434 A1 | 1/2016 | Kwon et al. | |

FOREIGN PATENT DOCUMENTS

| | | |
|---|---|---|
| JP | 2014120441 A | 6/2014 |
| JP | 2014523629 A | 9/2014 |
| JP | 2016505204 A | 2/2016 |
| JP | 2016105360 A | 6/2016 |
| JP | 2016111020 A | 6/2016 |

OTHER PUBLICATIONS

Written Opinion of the International Searching Authority issued in PCT/JP2017/037242, dated Dec. 5, 2017.

\* cited by examiner

LAMINATED SECONDARY BATTERY AND MANUFACTURING METHOD OF THE SAME, AND DEVICE

CROSS REFERENCE TO RELATED APPLICATIONS

The present application is a continuation of International application No. PCT/JP2017/037242, filed Oct. 13, 2017, which claims priority to Japanese Patent Application No. 2017-011977, filed Jan. 26, 2017, the entire contents of each of which are incorporated herein by reference.

FIELD OF THE INVENTION

The present invention relates to a laminated secondary battery, a manufacturing method of the same, and a device.

BACKGROUND OF THE INVENTION

Conventionally, a secondary battery has been used as a power source for various electronic devices. The secondary battery generally has a structure in which an electrode assembly (electrode body) and an electrolyte are accommodated in an exterior body. In recent years, the thinning and downsizing of electronic devices have progressed, and the demand for thinning and downsizing of a secondary battery is increasing accordingly.

As a secondary battery, a secondary battery having a laminated structure in which a positive electrode and a negative electrode are alternately laminated with a separator interposed between them is well known.

For example, in a laminated secondary battery in Patent Document 1, an electrode assembly is manufactured by using and laminating a positive electrode and a negative electrode separated for each electrode. A collector tab is formed for each electrode.

Further, for example, Patent Document 2 discloses a technique of manufacturing a pair of electrode plates in which two electrodes are connected in a non-coated region when an electrode is manufactured by coating an electrode material layer on an electrode current collector, and using the pair of electrode plates for manufacturing an electrode assembly. The pair of electrode plates are directly used in combination with an electrode of opposite polarity when the electrode assembly is assembled. Specifically, the pair of electrode plates are bent in the non-coated region in such a manner that two electrodes face each other so that a positive electrode and a negative electrode are alternately laminated, and then an electrode of the opposite polarity is inserted between them to manufacture an electrode assembly. In such a technique, a collector tab is not formed and the bent non-coated region is connected to an electrode terminal.

Patent Document 1: Japanese Unexamined Patent Application Publication (Translation of PCT Application) No. 2014-523629

Patent Document 2: Japanese Patent Application Laid-Open No. 2003-217601

SUMMARY OF THE INVENTION

However, the inventors of the present invention have found that the above-described conventional techniques cause a new problem described below.

In the technique of Patent Document 1, since the electrodes are separated one by one, handling of the electrodes is complicated, and, for example, problems of falling off and cracking of the electrode material layer occurred. In the technique of Patent Document 2, since a pair of electrode plates are used, although the problem of handleability of the electrode is solved to some extent, the pair of electrode plates are directly used when the electrode assembly is assembled, and the problems were not sufficiently solved.

In the technique of Patent Document 1, since the collector tab is formed for each electrode, there is a problem in safety in the event of short circuit. Safety at the time of a short circuit is one aspect of battery performance which becomes a problem when the electric resistance of the electrode itself is relatively low. From the viewpoint of efficient charging and discharging of the battery, the electric resistance of the electrode is preferably low. However, there has been a problem that, if the electric resistance of the electrode is excessively low, a relatively large current flows during short circuit, and the safety is impaired due to heat generation. For this reason, the electrode is required to have an appropriate electric resistance from the viewpoint of safety during a short circuit. The problem of safety during a short circuit becomes more prominent as the number of laminated electrodes is increased. In the technique of Patent Document 2, the non-coated region positioned in the center in a pair of electrode plates is connected to an electrode terminal, and the electric resistance of the electrode does not increase sufficiently as a whole as compared with a case where the collector tab is formed for each electrode, and the safety at the time of short circuit was deteriorated.

In the technique of Patent Document 1, when the secondary battery has step portions with top surfaces at different levels, it is necessary to cut out a plurality of electrodes having different sizes, and prepare a plurality of cutting molds corresponding to a plurality of sizes, which has caused an increase in cost. In the technique of Patent Document 2, the two electrodes of the pair of electrode plates have the same shape, and when the secondary battery has a step portion, it was necessary to cut out a plurality of electrodes of different sizes.

In the technique of Patent Document 1, the collector tab is formed for each electrode, and a lamination thickness of the collector tab becomes thick as the number of laminated electrodes increases. As a result, the jointability of the collector tab was deteriorated. Further, the size of the electrode terminal for accommodating the collector tab was increased, which interfered with a design shape of the battery cell.

It is an object of the present invention to provide a laminated secondary battery which is more excellent in handleability of an electrode and a manufacturing method for such a laminated secondary battery.

The present invention relates to a laminated secondary battery including an electrode assembly and an electrolyte accommodated in an exterior body, in which, in the electrode assembly, a positive and negative electrode laminate body including an electrode current collector and an electrode multi-unit having two or more electrode material layers formed on the electrode current collector with a non-forming region interposed therebetween is bent in the non-forming region of the electrode multi-unit.

The present invention also relates to a manufacturing method for the laminated secondary battery, the manufacturing method including: cutting an electrode precursor having an electrode material layer formed on a surface of an electrode current collector to obtain an electrode multi-unit; laminating and placing a plurality of the electrode multi-units on top of each other to obtain a positive and negative electrode laminate body; and bending the positive and negative electrode laminate body on a non-forming region of the electrode multi-unit to obtain an electrode assembly.

Since the laminated secondary battery of the present invention is further excellent in handleability of the electrode, falling off and cracking of the electrode material layer is suppressed.

DETAILED DESCRIPTION OF THE INVENTION

[Laminated Secondary Battery]

Figure 1A:
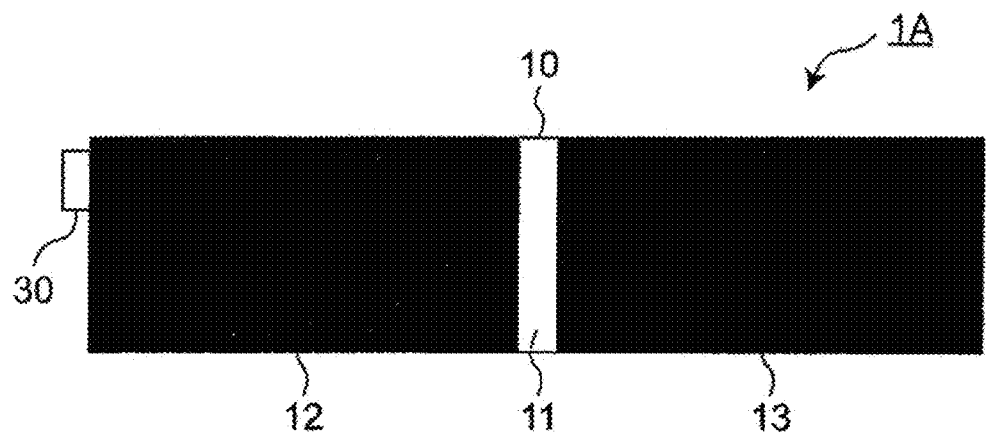
FIG. 1A is a top view of a positive electrode multi-unit schematically showing an example of a positive electrode multi-unit.

The present invention provides a laminated secondary battery (hereinafter sometimes simply referred to as a secondary battery). The term "secondary battery" as used in the present description refers to a battery that can be repeatedly charged and discharged. Therefore, the secondary battery of the present invention is not excessively restricted to its name, and may include, for example, "power storage device", and the like.

(Configuration of Secondary Battery)

Hereinafter, the secondary battery of the present invention will be described in detail with reference to drawings showing several embodiments. Various elements in the drawings are shown schematically and exemplarily only for the understanding of the present invention, and appearance, a dimensional ratio, and the like can be different from the actual ones. A "vertical direction", a "horizontal direction", and a "front and back direction" used directly or indirectly in the present description respectively correspond to a vertical direction, a horizontal direction, and a front and back direction in the diagrams. Unless otherwise specified, the same reference numerals or symbols shall denote the same members or the same meanings and contents. A "thickness" direction described directly or indirectly in the present description is based on a lamination direction of electrodes constituting the secondary battery, that is, a "thickness" corresponds to a dimension in the lamination direction of a positive electrode and a negative electrode.

In the secondary battery of the present invention, an electrode assembly and an electrolyte are accommodated in an exterior body.

The electrode assembly is formed by alternately laminating a positive electrode and a negative electrode with a separator interposed between them. That is, in the electrode assembly, one or more positive electrodes and one or more negative electrodes are alternately laminated with a separator interposed between them, and two or more of at least one of the positive electrode and the negative electrode are included. In the present description, each of the positive electrode and the negative electrode shall mean one layer of a positive electrode and one layer of a negative electrode in the electrode assembly unless otherwise specified. As used herein, the term "electrode" includes both a positive electrode and a negative electrode.

In the present invention, in electrodes of at least one polarity, preferably in electrodes of both the polarities among all the positive electrodes and all the negative electrodes constituting the electrode assembly, at least part of a plurality of electrodes are configured with an electrode multi-unit described later. Specifically, the electrode assembly may have a mode, in which a plurality of positive electrodes as part of all the positive electrodes are configured with the electrode multi-unit, may have a mode, in which a plurality of negative electrodes as part of all the negative electrodes are configured with the electrode multi-unit, or may have both of these.

In the present invention, the electrode assembly has a positive and negative electrode laminate body including the electrode multi-unit.

Figure 1B:
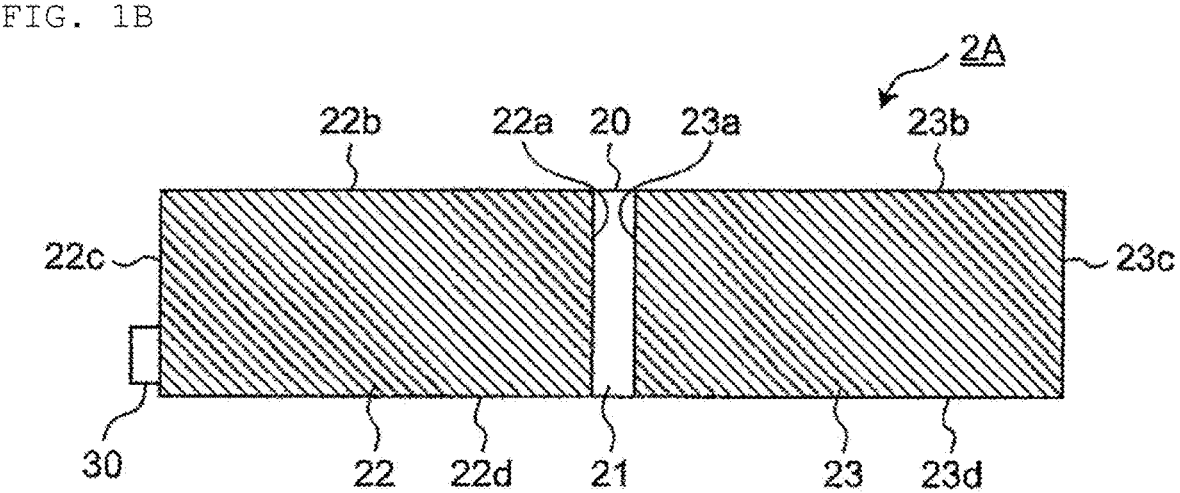
FIG. 1B is a top view of a negative electrode multi-unit schematically showing an example of a negative electrode multi-unit.

The electrode multi-unit has an electrode current collector and two or more electrode material layers formed on the electrode current collector with a non-forming region interposed between them. That is, in the electrode multi-unit, two or more electrode material layers are formed on the electrode current collector with mutually non-forming regions interposed between them. The electrode material layer portion of such an electrode multi-unit constitutes the electrode of the electrode assembly. The electrode material layer portion is a portion including the electrode material layer and the electrode current collector on which the electrode material layer is formed. The electrode multi-unit includes a positive electrode multi-unit (that is, an electrode multi-unit for the positive electrode) and a negative electrode multi-unit (that is, an electrode multi-unit for the negative electrode). The electrode current collector includes a positive electrode current collector and a negative electrode current collector. The electrode material layer includes a positive electrode material layer and a negative electrode material layer. Specifically, as shown in FIG. 1A, a positive electrode multi-unit 1A includes a positive electrode current collector 10 and two or more positive electrode material layers (for example, 12, 13) formed on the positive electrode current collector with a non-forming region 11 interposed between them, and two or more of the positive electrode layer portions constitute two or more positive electrodes. Further, for example, as shown in FIG. 1B, a negative electrode multi-unit 2A includes a negative electrode current collector 20 and two or more negative electrode material layers (for example, 22, 23) formed on the negative electrode current collector with a non-forming region 21 interposed between them, and two or more of the negative electrode layer portions constitute two or more negative electrodes. FIG. 1A is a top view of a positive electrode multi-unit that schematically shows an example of the positive electrode multi-unit. FIG. 1B is a top view of a negative electrode multi-unit schematically showing an example of the negative electrode multi-unit. In the electrode multi-unit included in the secondary battery (laminated type) of the present invention, two or more electrode material layers are formed on the electrode current collector with a non-forming region interposed between them as described above. Therefore, the secondary battery (laminated type) of the present invention differs from a wound secondary battery in which electrode material layers is continuously formed in a winding direction, in terms of a formation mode of the electrode material layer.

The number of the electrode material layers in the electrode multi-unit is the number per one side of the electrode current collector. The electrode multi-unit usually has two or more electrode material layers formed on both sides of the electrode current collector with a non-forming region interposed between them. In this case, the number, arrangement, and dimensions of the electrode material layers on the front and back of the electrode current collector are usually in agreement. That is, immediately under or immediately above a region where each electrode material layer is formed on one surface of the electrode current collector, each electrode material layer on the other surface is formed with the electrode current collector interposed between them. Note that all the electrode material layers of one electrode multi-unit have the same polarity.

Two or more electrode material layers of the electrode multi-unit may independently have a rectangular shape or an irregular shape in a plan view.

The electrode multi-unit may have a rectangular shape or an irregular shape in the plan view. A plan view shape of the electrode multi-unit is a plan view shape including all electrode material layers and a non-forming region between them. The non-forming region is usually a region positioned between two electrode material layers adjacent to each other with the non-forming region interposed between them. The number of non-forming regions in the electrode multi-unit is the number per one side of the electrode current collector, and the number of non-forming regions positioned between two electrode material layers is one. It should be noted that the electrode multi-unit may normally be bent in all non-forming regions.

The plan view refers to a state when an object (for example, the electrode multi-unit, the electrode material layer, or the secondary battery) is placed and viewed from just above in a thickness (height) direction, and has the same meaning as a top view. The placement means that an object (for example, the electrode multi-unit, the electrode material layer, or the secondary battery) is placed with its surface of a largest area as a bottom surface. The rectangular shape includes what is called a rectangular shape and a square shape, and is preferably a rectangular shape. The irregular shape in the plan view shape of the electrode material layer and the electrode multi-unit means a shape having a notch portion in the plan view. The notch portion is a portion that is intentionally cut out from an initial shape. The initial shape before formation of the notch portion is usually quadrangular (for example, rectangular). A plan view shape of the notch portion is not particularly limited, and examples of the plan view shape include a quadrangular shape (for example, a rectangular shape), a triangular shape, a fan shape, a semicircular shape, a circular shape, and the like.

The positive and negative electrode laminate body is a precursor of an electrode assembly capable of constituting an electrode assembly by being bent itself, and includes one or more electrode multi-units. That is, the positive and negative electrode laminate body preferably includes one or more electrode multi-units of at least one of the positive electrode multi-unit and the negative electrode multi-unit, and may further include one or more electrode single units.

The electrode single unit is an electrode single unit having only one electrode material layer per one side on a surface of the electrode current collector, and includes a positive electrode single unit (that is, the electrode single unit for the positive electrode) and a negative electrode single unit (that is, the electrode single unit for the negative electrode). In the electrode single unit, usually electrode material layers are formed on both surfaces of the electrode current collector, and a non-forming region (excluding a collector tab) is not provided.

In the positive and negative electrode laminate body, the electrode multi-unit and the electrode single unit are arranged such that the positive electrode and the negative electrode are alternately laminated with the separator interposed between them in the electrode assembly. For example, in the positive and negative electrode laminate body, a unit for the positive electrode (the electrode multi-unit or the electrode single unit for the positive electrode) and a unit for the negative electrode (the electrode multi-unit or the electrode single unit for the negative electrode) are alternately laminated with the separator interposed between them. Further, for example, in a case where the positive and negative electrode laminate body includes two or more electrode multi-units, the two or more electrode multi-units are laminated in such a manner that at least the non-forming regions overlap each other so that the positive and negative electrode laminate body can be bent. That the non-forming regions overlap each other means that, in the plan view, non-forming regions overlap each other between two or more electrode multi-units. Preferably, non-forming regions overlap each other in the plan view also between all of the two or more electrode multi-units.

Figure 2A:
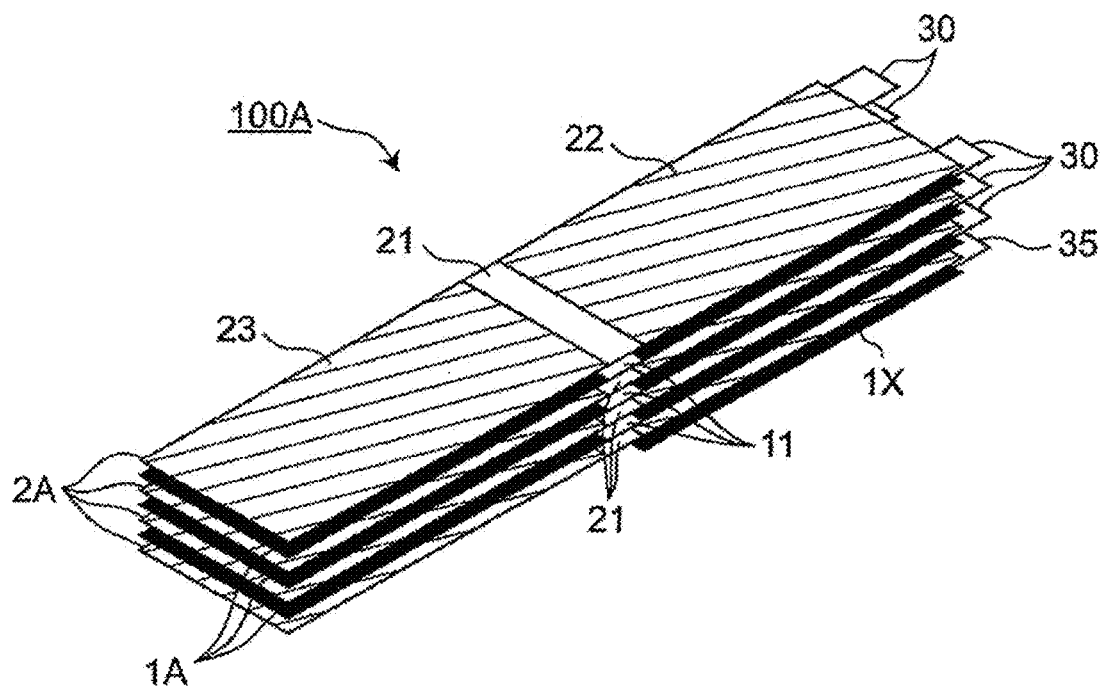
FIG. 2A is a view schematically showing an example of a positive and negative electrode laminate body including an electrode multi-unit.
Figure 2B:
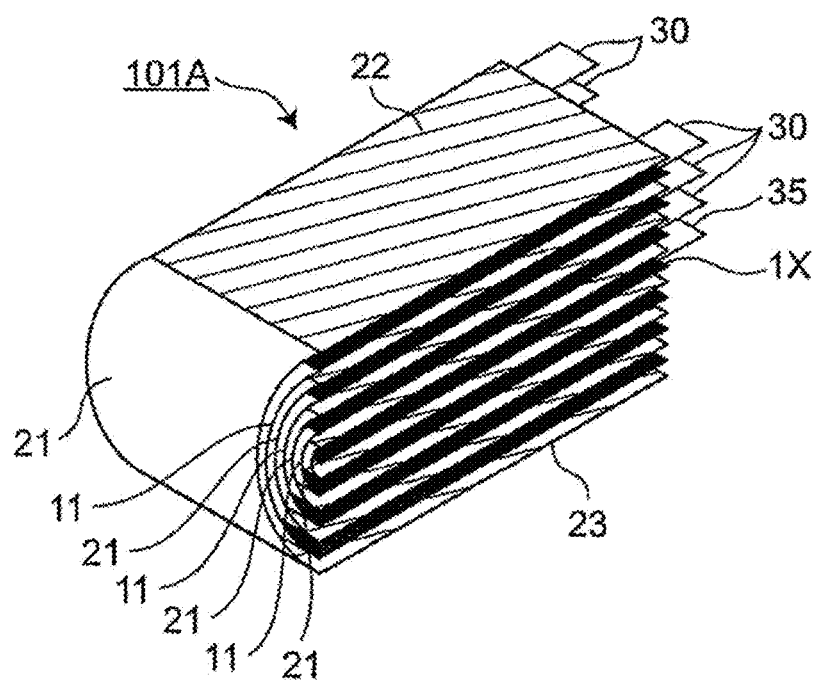
FIG. 2B is a view schematically showing an electrode assembly obtained by bending the positive and negative electrode laminate body of FIG. 2A in a non-forming region of the electrode multi-unit.

An example of the positive and negative electrode laminate body is shown in FIG. 2A. A positive and negative electrode laminate body 100A shown in FIG. 2A includes three positive electrode multi-units 1A, four negative electrode multi-units 2A, and one positive electrode single unit 1X. As shown in FIG. 2B, by bending the positive and negative electrode laminate body 100A in the non-forming regions 11, 21 of the electrode multi-units 1A, 2A, an electrode assembly 101A is constituted, and as a result, each electrode material layer portion of the electrode multi-units 1A, 2A constitutes each electrode. In the present invention, since the positive and negative electrode laminate body including the electrode multi-unit is formed in the above manner and the positive and negative electrode laminate body is used as the electrode assembly, handling-ability of the electrode is improved as compared with a case where only the electrode single unit having only one electrode material layer per one surface is used. Therefore, falling off and cracking of the electrode material layer at the time of handling the electrode can be prevented. FIG. 2A is a view schematically showing an example of the positive and negative electrode laminate body including the electrode multi-unit. FIG. 2B is a view schematically showing the electrode assembly obtained by bending the positive and negative electrode laminate body of FIG. 2A in the non-forming region of the electrode multi-unit. Note that, in FIGS. 2A and 2B, the separator between the electrodes is omitted. In the positive and negative electrode laminate body of FIG. 2A, all of the electrode multi-units have two electrode material layers on each of both surfaces of the electrode current collector, and one electrode single unit has the electrode material layer on both surfaces of the electrode current collector.

In FIG. 2A, the positive and negative electrode laminate body 100A includes the electrode single unit 1X, which is because an electrode multi-unit on an innermost side (lowermost layer) is a double-sided electrode multi-unit having electrode material layers on both surfaces of the electrode current collector. Specifically, the electrode single unit is included in order to avoid electrode material layers of the same polarity from being continuous in the double-sided electrode multi-unit on an innermost side in a laminating direction of the electrode assembly. The positive and negative electrode laminate body does not always need to include the electrode single unit. For example, when an electrode multi-unit on an innermost side (lowermost layer) in the positive and negative electrode laminate body is a single-sided electrode multi-unit having an electrode material layer on only one surface of the electrode current collector, the positive and negative electrode laminate body does not need to include the electrode single unit from the viewpoint of improvement of energy density, since the single-sided electrode multi-unit is folded on the other surface (a surface on which the electrode material layer is not formed). In this case, the single-sided electrode multi-unit on the innermost side (lowermost layer) is disposed so as to be folded on a surface where the electrode material layer is not formed at the time of bending. Note that whether the electrode multi-unit on the innermost side (lowermost layer) is a double-sided electrode or a single-sided electrode is a matter that depends on the design of the secondary battery.

From the viewpoint of further improving the handleability of the electrode, the positive and negative electrode laminate body preferably includes as many electrode multi-units as possible. That is, as shown in FIG. 2A, the positive and negative electrode laminate body preferably include one or more of the positive electrode multi-units 1A and one or more of the negative electrode multi-units 2A. As described above, in a case where the electrode multi-unit on the innermost side (lowermost layer) is a double-sided electrode multi-unit, the electrode single unit 1X may be further included. The number of the electrode single units 1X is determined according to the number of times of bending of the positive and negative electrode laminate body. When the number of times of bending is n (where n is a natural number of 1 or more), the number of the electrode single units is n. This is because two electrode material layers of the same polarity in one electrode multi-unit on the innermost side are continuous in the lamination direction of the electrode assembly by one time of bending of the positive and negative electrode laminate body. Specifically, in a case where the electrode assembly is constituted by bending the positive and negative electrode laminate body n times, one of the electrode single unit 1X is placed at a position substantially sandwiched by the electrode multi-unit on the innermost side in each time of bending. The position substantially sandwiched means a position sandwiched under a structure of the obtained electrode assembly. For example, the position substantially sandwiched does not include a position that is sandwiched by the electrode multi-unit on the innermost side by the first time to "k−1"-th time of bending and not by k-th time of (final) bending in k (where k is a natural number of two or larger) times of bending. For example, as shown in FIGS. 2A and 2B, in a case where the electrode assembly 101A is constituted by one time of bending of the positive and negative electrode laminate body 100A, one of the electrode single unit 1X is placed at a position substantially sandwiched by the electrode multi-unit on the innermost side by the bending. Note that the polarity of the electrode single unit 1X is opposite to the polarity of the electrode multi-unit on the innermost side.

From the viewpoint of further improving the handleability of the electrode, the positive and negative electrode laminate body preferably includes two or more, particularly two or more and eight or fewer positive electrode multi-units and particularly two or more and eight or fewer negative electrode multi-units.

In a case where the positive and negative electrode laminate body includes two or more electrode multi-units, the two or more electrode multi-units may be under the same appearance conditions, such as, for example, a plan view shape and dimensions of the electrode multi-units, and arrangement of forming regions and non-forming regions, plan view shapes, dimensions, and the like of two or more electrode material layers on the electrode current collector, so that an electrode assembly of a desired appearance shape can be obtained. Further, for example, the two or more electrode multi-units may be under conditions at least one of which is different from those selected from a group consisting of the appearance conditions, or conditions which are both the same as or different from the above ones. In any case, as described above, the two or more electrode multi-units are laminated in such a manner that at least the non-forming regions overlap each other, so that the positive and negative electrode laminate bodies can be bent. Note that, with respect to the plan view shape of the electrode multi-unit, the arrangement and dimensions of the collector tab described below are not taken into consideration.

Figure 3A:
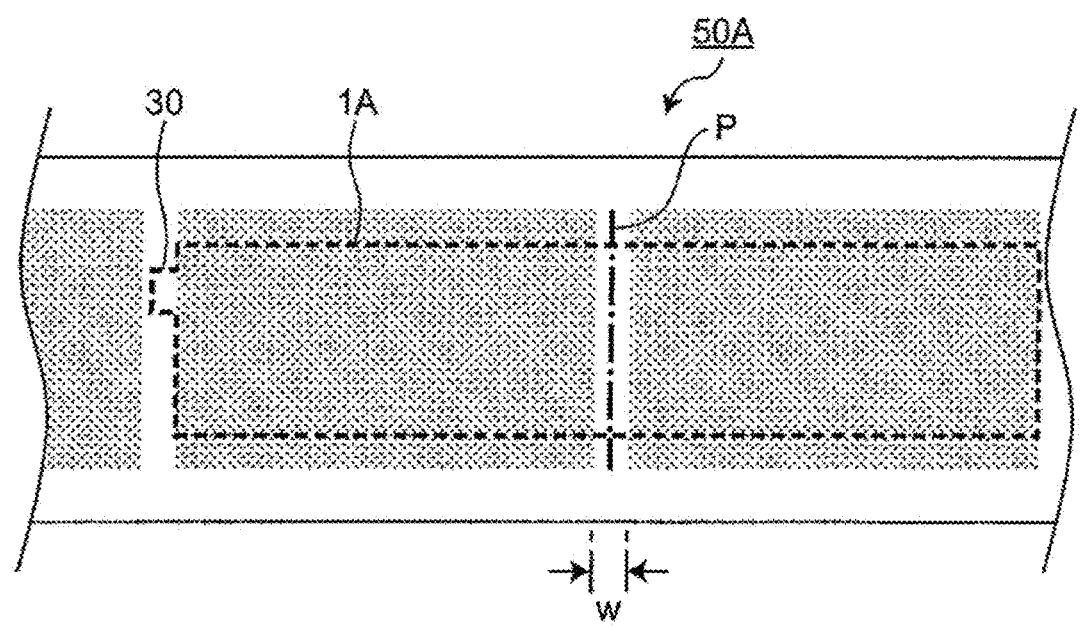
FIG. 3A is a schematic diagram for explaining a method of cutting out the electrode multi-unit of FIG. 1A from an electrode precursor.
Figure 3B:
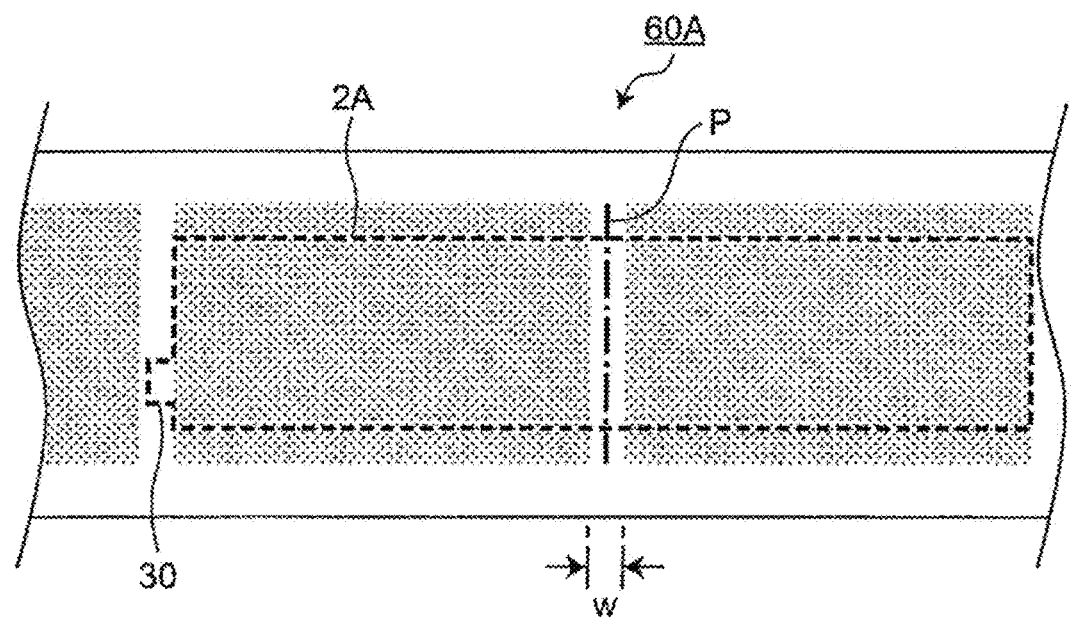
FIG. 3B is a schematic diagram for explaining a method of cutting out the electrode multi-unit of FIG. 1B from the electrode precursor.

For example, the above appearance conditions of all the electrode multi-units 1A and 2A used in the positive and negative electrode laminate body 100A of FIG. 2A are the same. The plan view shape of the electrode multi-unit 1A and the plan view shape of the two electrode material layers are rectangular as shown in FIG. 1A, and the plan view shapes of the two electrode material layers are mutually linearly symmetric with respect to an alternate long and short dashed line P, and, as shown in FIG. 3A, the electrode multi-unit 1A is cut out from an electrode precursor 50A. The plan view shape of the electrode multi-unit 2A and the plan view shape of the two electrode material layers are rectangular as shown in FIG. 1B, and the plan view shapes of the two electrode material layers are mutually linearly symmetric with respect to an alternate long and short dashed line P, and, as shown in FIG. 3B, the electrode multi-unit 2A is cut out from an electrode precursor 60A. When only one or more of the electrode multi-units 1A and one or more of the electrode multi-units 2A are used as the electrode multi-unit and the positive and negative electrode laminate body in which these are superposed is bent once at an alternate long and short dashed line, the electrode assembly (see FIG. 2B) and the secondary battery obtained by using the electrode assembly have a substantially parallelepiped appearance shape. FIG. 3A is a schematic view for explaining a method of cutting out the electrode multi-unit of FIG. 1A from the electrode precursor, and a broken line is a cutting line and the alternate long and short dashed line P shows a mountain fold or a valley fold when bending is performed. FIG. 3B is a schematic view for explaining a method of cutting out the electrode multi-unit of FIG. 1B from the electrode precursor, and a broken line is a cutting line and the alternate long and short dashed line P shows a mountain fold or a valley fold when bending is performed. That the plan view shape is linearly symmetric means that when the shape is folded back at a reference line, the folded portions completely overlap each other, and the shapes and dimensions of the folded portions are the same.

Specific examples of the electrode multi-unit are shown in FIGS. 4 to 15. FIGS. 4 to 15 are schematic diagrams for explaining a method of cutting out an example of the electrode multi-unit from the electrode precursor, and a broken line is a cutting line, the alternate long and short dashed line P shows a mountain fold or a valley fold when bending is performed, an alternate long and short dashed line Q shows a mountain fold, and an alternate long and short dashed line R shows a valley fold.

Figure 4:
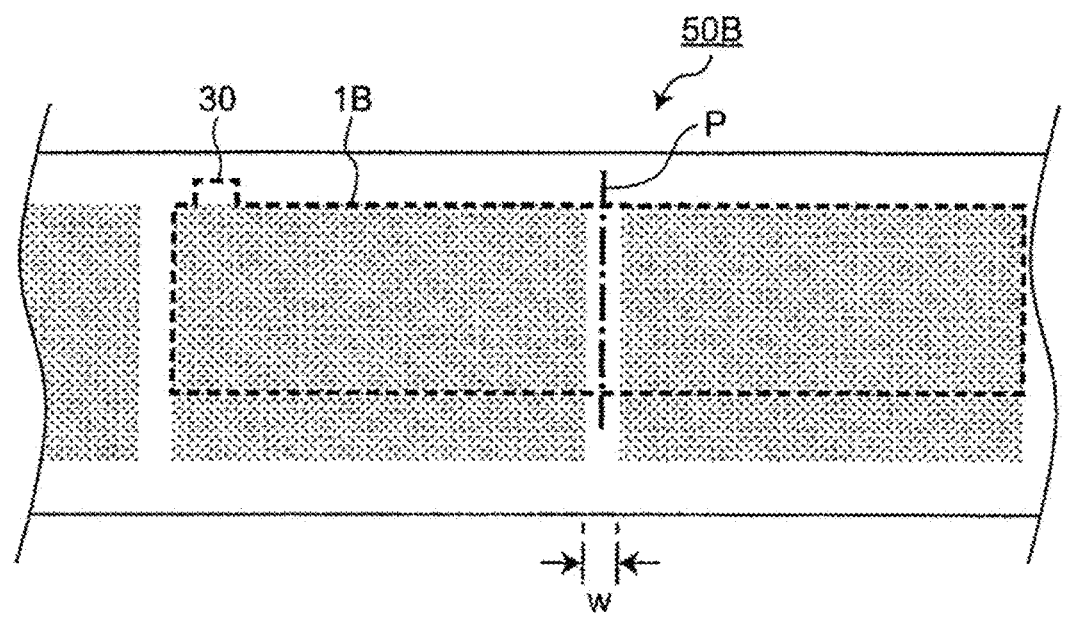
FIG. 4 is a schematic diagram for explaining a method of cutting out an example of the electrode multi-unit from the electrode precursor.

All the above appearance conditions of the electrode multi-unit 1B shown in FIG. 4 are similar to those of the electrode multi-unit 1A of FIG. 3A, and only the arrangement of the collector tab to be described later is different. When only two or more of the electrode multi-units 1B are used as the electrode multi-unit and the positive and negative electrode laminate body in which these are superposed is bent once at an alternate long and short dashed line, the electrode assembly and the secondary battery obtained by using the electrode assembly have a substantially parallelepiped appearance shape. Note that the two or more of the electrode multi-units 1B include a positive electrode multi-unit 1B and a negative electrode multi-unit 1B with different collector tab arrangements. One of the positive electrode multi-unit 1B and the negative electrode multi-unit 1B may be similar to the electrode multi-unit 1B of FIG. 4, and the other one may be similar to the electrode multi-unit 1B of FIG. 4 except that the arrangement of the collector tab is different.

Figure 5:
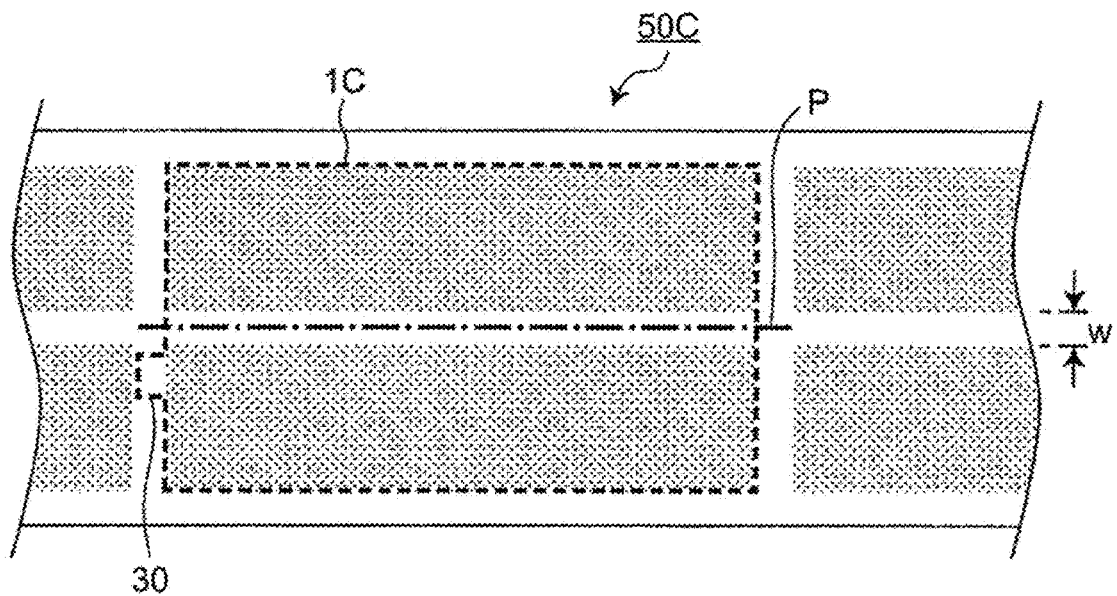
FIG. 5 is a schematic diagram for explaining a method of cutting out an example of the electrode multi-unit from the electrode precursor.

A plan view shape of an electrode multi-unit 1C shown in FIG. 5 and a plan view shape of two electrode material layers are rectangular, and the plan view shapes of the two electrode material layers are mutually linearly symmetric with respect to the alternate long and short dashed line P. When only two or more of the electrode multi-units 1C are used as the electrode multi-unit and the positive and negative electrode laminate body in which these are superposed is bent once at an alternate long and short dashed line, the electrode assembly and the secondary battery obtained by using the electrode assembly have a substantially parallelepiped appearance shape. Note that the two or more of the electrode multi-units 1C include a positive electrode multi-unit 1C and a negative electrode multi-unit 1C with different collector tab arrangements. One of the positive electrode multi-unit 1C and the negative electrode multi-unit 1C may be similar to the electrode multi-unit 1C of FIG. 5, and the other one may be similar to the electrode multi-unit 1C of FIG. 5 except that the arrangement of the collector tab is different.

Figure 6:
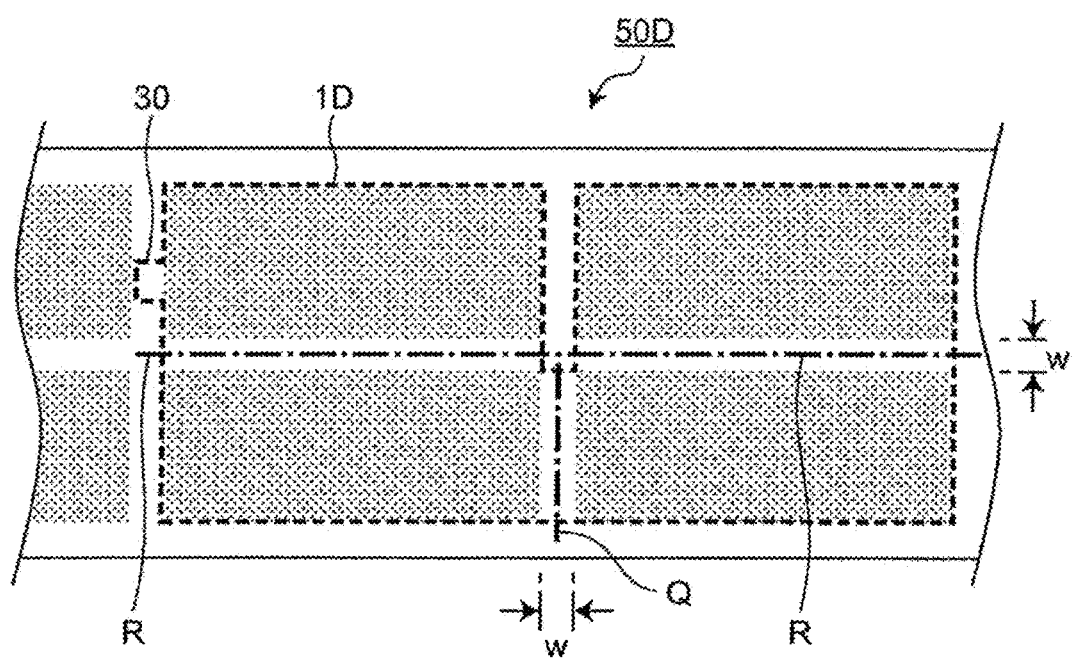
FIG. 6 is a schematic diagram for explaining a method of cutting out an example of the electrode multi-unit from the electrode precursor.

A plan view shape of an electrode multi-unit 1D shown in FIG. 6 and a plan view shape of four electrode material layers are rectangular. Among the four electrode material layers, a plan view shape of two electrode material layers arranged across an alternate long and short dashed line is linearly symmetric with respect to the alternate long and short dashed line. When only two or more of the electrode multi-units 1D are used as the electrode multi-unit, and the positive and negative electrode laminate body in which these are superposed is bent once at an alternate long and short dashed line of each of them, the electrode assembly and the secondary battery obtained by using the electrode assembly have a substantially parallelepiped appearance shape. Note that the two or more of the electrode multi-units 1D include a positive electrode multi-unit 1D and a negative electrode multi-unit 1D with different collector tab arrangements. One of the positive electrode multi-unit 1D and the negative electrode multi-unit 1D may be similar to the electrode multi-unit 1D of FIG. 6, and the other one may be similar to the electrode multi-unit 1D of FIG. 6 except that the arrangement of the collector tab is different.

Figure 7:
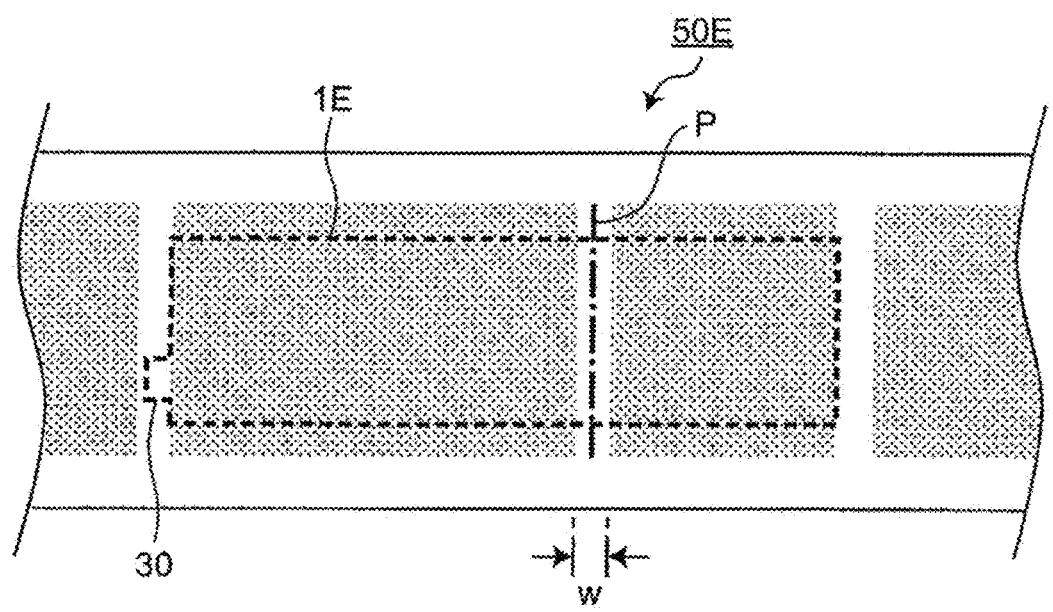
FIG. 7 is a schematic diagram for explaining a method of cutting out an example of the electrode multi-unit from the electrode precursor.

A plan view shape of an electrode multi-unit 1E shown in FIG. 7 and a plan view shape of two electrode material layers are rectangular, and the plan view shapes of the two electrode material layers are not linearly symmetric with respect to the alternate long and short dashed line P. When only two or more of the electrode multi-units 1E are used as the electrode multi-unit and the positive and negative electrode laminate body in which these are superposed is bent once at an alternate long and short dashed line, the electrode assembly and the secondary battery obtained by using the electrode assembly have an appearance shape including one step portion in a side view. Note that the two or more of the electrode multi-units 1E include a positive electrode multi-unit 1E and a negative electrode multi-unit 1E with different collector tab arrangements. One of the positive electrode multi-unit 1E and the negative electrode multi-unit 1E may be similar to the electrode multi-unit 1E of FIG. 7, and the other one may be similar to the electrode multi-unit 1E of FIG. 7 except that the arrangement of the collector tab is different. The step portion is a portion configured with two top surfaces at relatively different levels in the side view and a side surface connecting these top surfaces, and a discontinuous portion of the top surfaces. The side view refers to a state when an object (for example, the electrode assembly or the secondary battery) is placed and viewed from the side in a thickness (height) direction. The placement means that an object (for example, the electrode assembly or the secondary battery) is placed with its surface of a largest area as a bottom surface. The top surface means a top surface when an object (for example, the electrode assembly or the secondary battery) is placed with its surface of a largest area as a bottom surface.

Figure 8:
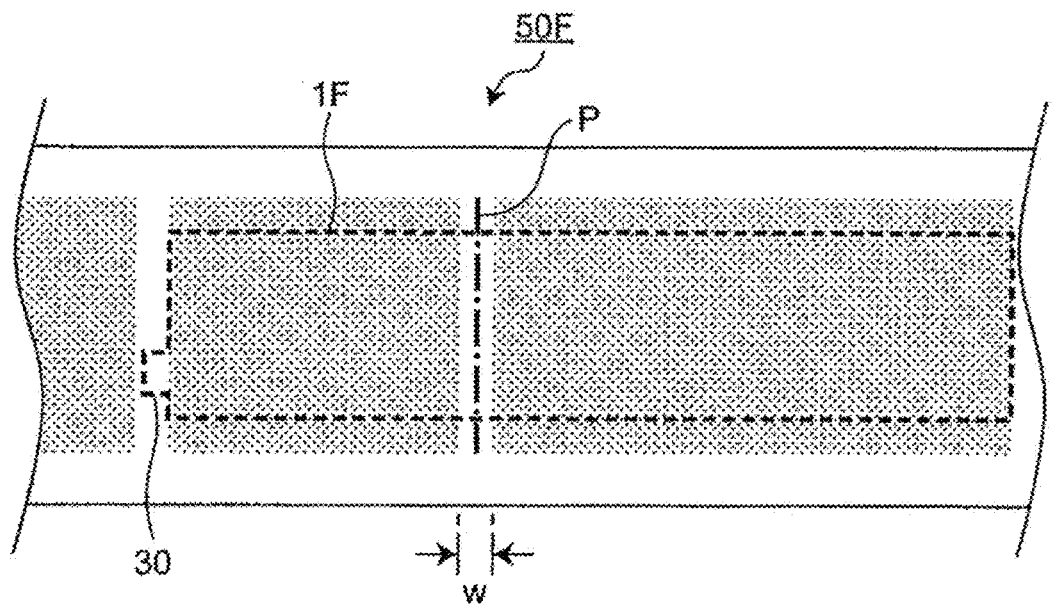
FIG. 8 is a schematic diagram for explaining a method of cutting out an example of the electrode multi-unit from the electrode precursor.

A plan view shape of an electrode multi-unit 1F shown in FIG. 8 and a plan view shape of two electrode material layers are rectangular, and the plan view shapes of the two electrode material layers are not linearly symmetric with respect to the alternate long and short dashed line P. When only two or more of the electrode multi-units 1F are used as the electrode multi-unit and the positive and negative electrode laminate body in which these are superposed is bent once at an alternate long and short dashed line, the electrode assembly and the secondary battery obtained by using the electrode assembly have an appearance shape including one step portion in a side view. Note that the two or more of the electrode multi-units 1F include a positive electrode multi-unit 1F and a negative electrode multi-unit 1F with different collector tab arrangements. One of the positive electrode multi-unit 1F and the negative electrode multi-unit 1F may be similar to the electrode multi-unit 1F of FIG. 8, and the other one may be similar to the electrode multi-unit 1F of FIG. 8 except that the arrangement of the collector tab is different.

Figure 9:
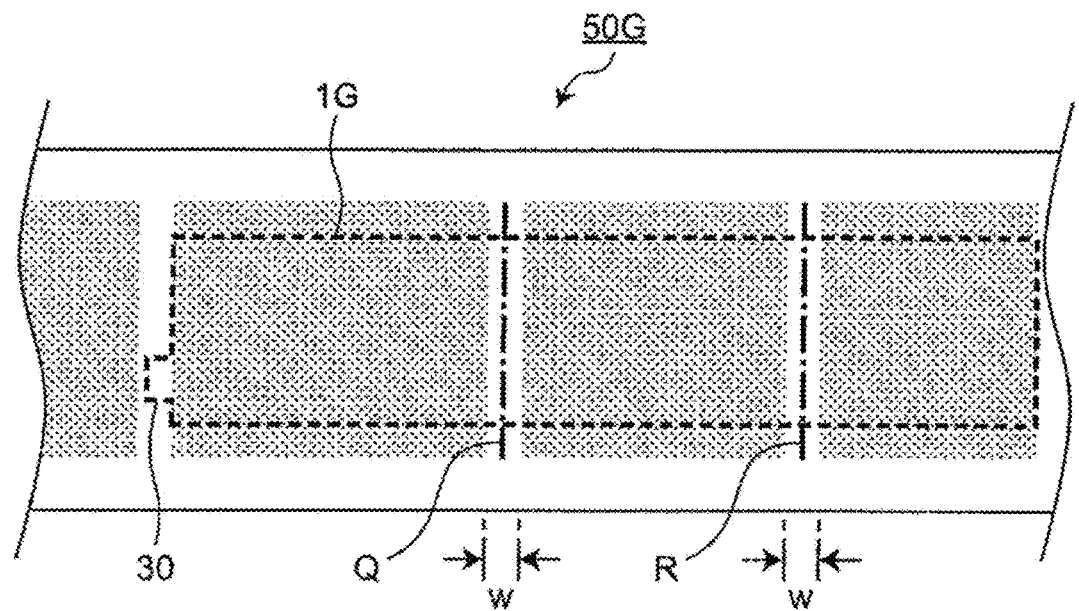
FIG. 9 is a schematic diagram for explaining a method of cutting out an example of the electrode multi-unit from the electrode precursor.

A plan view shape of an electrode multi-unit 1G shown in FIG. 9 and a plan view shape of three electrode material layers are rectangular, and the plan view shapes of all of two sets of two electrode material layers arranged across an alternate long and short dashed line among the three electrode material layers are not linearly symmetric with respect to an alternate long and short dashed lines. When only two or more of the electrode multi-units 1G are used as the electrode multi-unit and the positive and negative electrode laminate body in which these are superposed is bent once at an alternate long and short dashed line of each of them, the electrode assembly and the secondary battery obtained by using the electrode assembly have an appearance shape including two step portions in a side view. Note that the two or more of the electrode multi-units 1G include a positive electrode multi-unit 1G and a negative electrode multi-unit 1G with different collector tab arrangements. One of the positive electrode multi-unit 1G and the negative electrode multi-unit 1G may be similar to the electrode multi-unit 1G of FIG. 9, and the other one may be similar to the electrode multi-unit 1G of FIG. 9 except that the arrangement of the collector tab is different.

Figure 10:
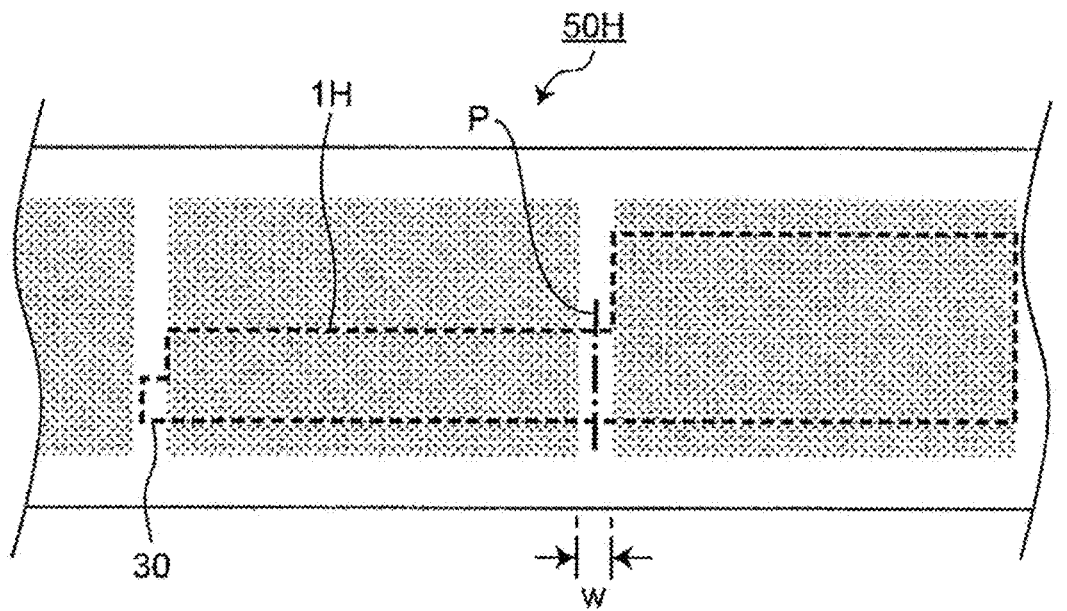
FIG. 10 is a schematic diagram for explaining a method of cutting out an example of the electrode multi-unit from the electrode precursor.

A plan view shape of an electrode multi-unit 1H shown in FIG. 10 is an irregular shape, a plan view shape of two electrode material layers is rectangular, and the plan view shapes of the two electrode material layers are not linearly symmetric with respect to the alternate long and short dashed line P. When only two or more of the electrode multi-units 1H are used as the electrode multi-unit and the positive and negative electrode laminate body in which these are superposed is bent once at an alternate long and short dashed line, the electrode assembly and the secondary battery obtained by using the electrode assembly have an appearance shape including one step portion in a side view. Note that the two or more of the electrode multi-units 1H include a positive electrode multi-unit 1H and a negative electrode multi-unit 1H with different collector tab arrangements. One of the positive electrode multi-unit 1H and the negative electrode multi-unit 1H may be similar to the electrode multi-unit 1H of FIG. 10, and the other one may be similar to the electrode multi-unit 1H of FIG. 10 except that the arrangement of the collector tab is different.

Figure 11:
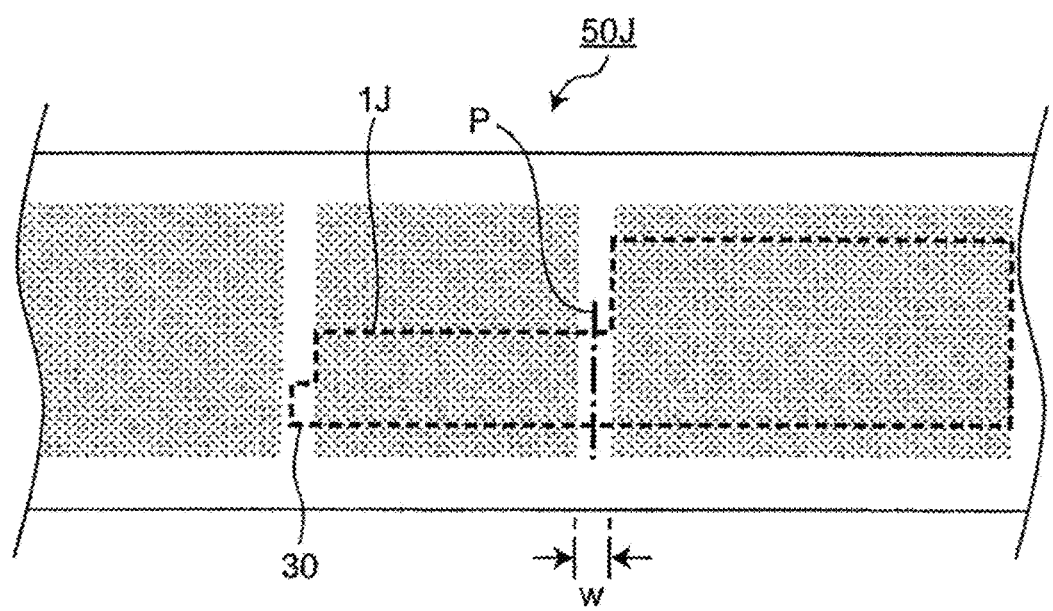
FIG. 11 is a schematic diagram for explaining a method of cutting out an example of the electrode multi-unit from the electrode precursor.

A plan view shape of an electrode multi-unit 1J shown in FIG. 11 is an irregular shape, a plan view shape of two electrode material layers are rectangular, and the plan view shapes of the two electrode material layers are not linearly symmetric with respect to the alternate long and short dashed line P. When only two or more of the electrode multi-units 1J are used as the electrode multi-unit and the positive and negative electrode laminate body in which these are superposed is bent once at an alternate long and short dashed line, the electrode assembly and the secondary battery obtained by using the electrode assembly have an appearance shape including one step portion in a side view. Note that the two or more of the electrode multi-units 1J include a positive electrode multi-unit 1J and a negative electrode multi-unit 1J with different collector tab arrangements. One of the positive electrode multi-unit 1J and the negative electrode multi-unit 1J may be similar to the electrode multi-unit 1J of FIG. 11, and the other one may be similar to the electrode multi-unit 1J of FIG. 11 except that the arrangement of the collector tab is different.

Figure 12:
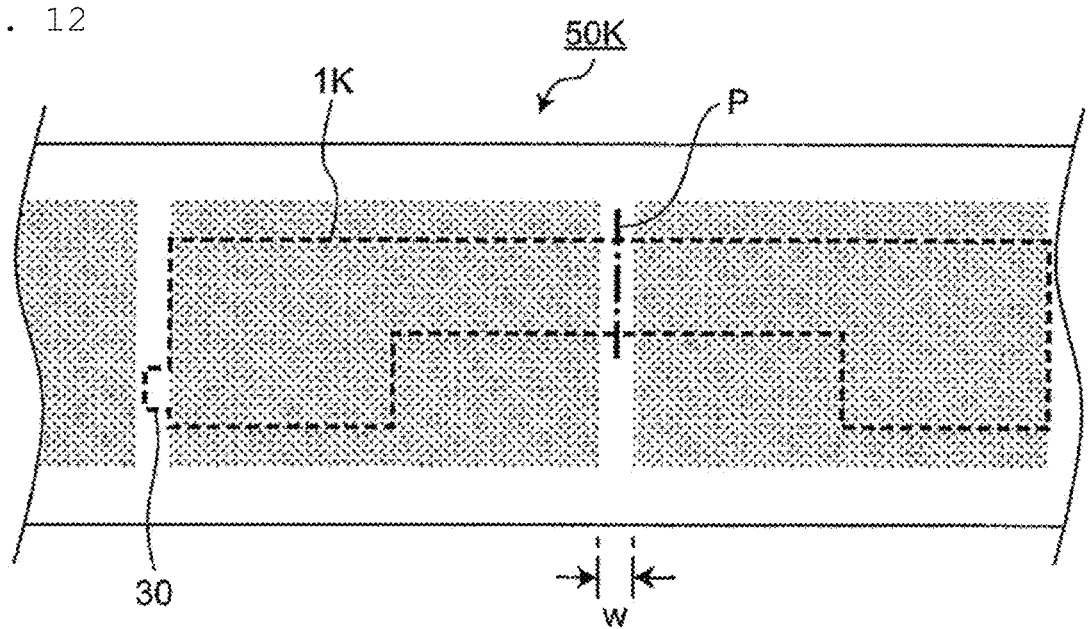
FIG. 12 is a schematic diagram for explaining a method of cutting out an example of the electrode multi-unit from the electrode precursor.

A plan view shape of an electrode multi-unit 1K shown in FIG. 12 is an irregular shape, a plan view shape of two electrode material layers is also an irregular shape, and the plan view shapes of the two electrode material layers are linearly symmetric with respect to the alternate long and short dashed line. When only two or more of the electrode multi-units 1K are used as the electrode multi-unit and the positive and negative electrode laminate body in which these are superposed is bent once at an alternate long and short dashed line, the electrode assembly and the secondary battery obtained by using the electrode assembly have an appearance shape including one notch portion in the plan view. Note that the two or more of the electrode multi-units 1K include a positive electrode multi-unit 1K and a negative electrode multi-unit 1K with different collector tab arrangements. One of the positive electrode multi-unit 1K and the negative electrode multi-unit 1K may be similar to the electrode multi-unit 1K of FIG. 12, and the other one may be similar to the electrode multi-unit 1K of FIG. 12 except that the arrangement of the collector tab is different.

Figure 13:
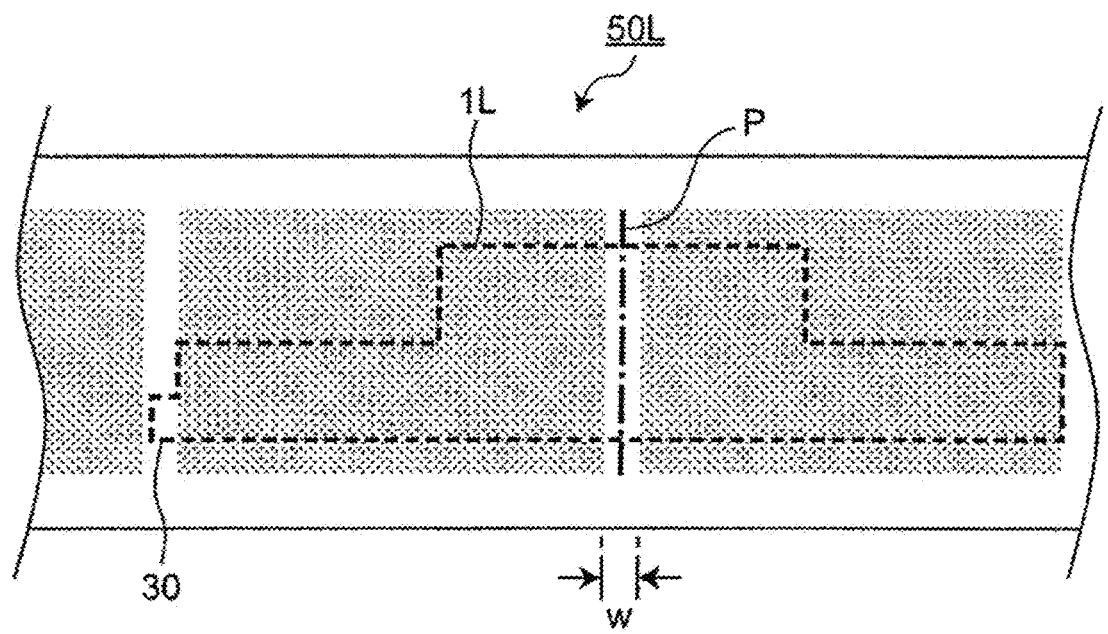
FIG. 13 is a schematic diagram for explaining a method of cutting out an example of the electrode multi-unit from the electrode precursor.

A plan view shape of an electrode multi-unit 1L shown in FIG. 13 is an irregular shape, a plan view shape of two electrode material layers is also an irregular shape, and the plan view shapes of the two electrode material layers are linearly symmetric with respect to the alternate long and short dashed line. When only two or more of the electrode multi-units 1L are used as the electrode multi-unit and the positive and negative electrode laminate body in which these are superposed is bent once at an alternate long and short dashed line, the electrode assembly and the secondary battery obtained by using the electrode assembly have an appearance shape including one notch portion in the plan view. Note that the two or more of the electrode multi-units 1L include a positive electrode multi-unit 1L and a negative electrode multi-unit 1L with different collector tab arrangements. One of the positive electrode multi-unit 1L and the negative electrode multi-unit 1L may be similar to the electrode multi-unit 1L of FIG. 13, and the other one may be similar to the electrode multi-unit 1L of FIG. 13 except that the arrangement of the collector tab is different.

Figure 14:
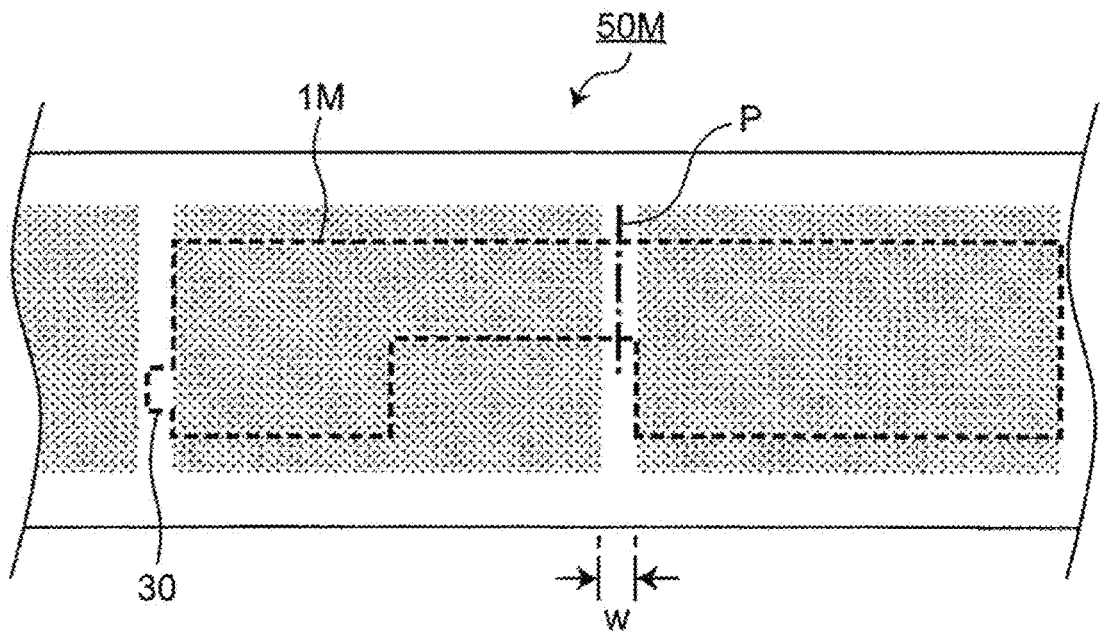
FIG. 14 is a schematic diagram for explaining a method of cutting out an example of the electrode multi-unit from the electrode precursor.

A plan view shape of an electrode multi-unit 1M shown in FIG. 14 is an irregular shape, a plan view shape of one of two electrode material layers is a rectangular shape, and a plan view shape of the other one is an irregular shape. The plan view shape of the two electrode material layers is not linearly symmetric with respect to the alternate long and short dashed line. When only two or more of the electrode multi-units 1M are used as the electrode multi-unit and the positive and negative electrode laminate body in which these are superposed is bent once at an alternate long and short dashed line, the electrode assembly and the secondary battery obtained by using the electrode assembly have an appearance shape including one step portion in the side view. Note that the two or more of the electrode multi-units 1M include a positive electrode multi-unit 1M and a negative electrode multi-unit 1M with different collector tab arrangements. One of the positive electrode multi-unit 1M and the negative electrode multi-unit 1M may be similar to the electrode multi-unit 1M of FIG. 14, and the other one may be similar to the electrode multi-unit 1M of FIG. 14 except that the arrangement of the collector tab is different.

Figure 15:
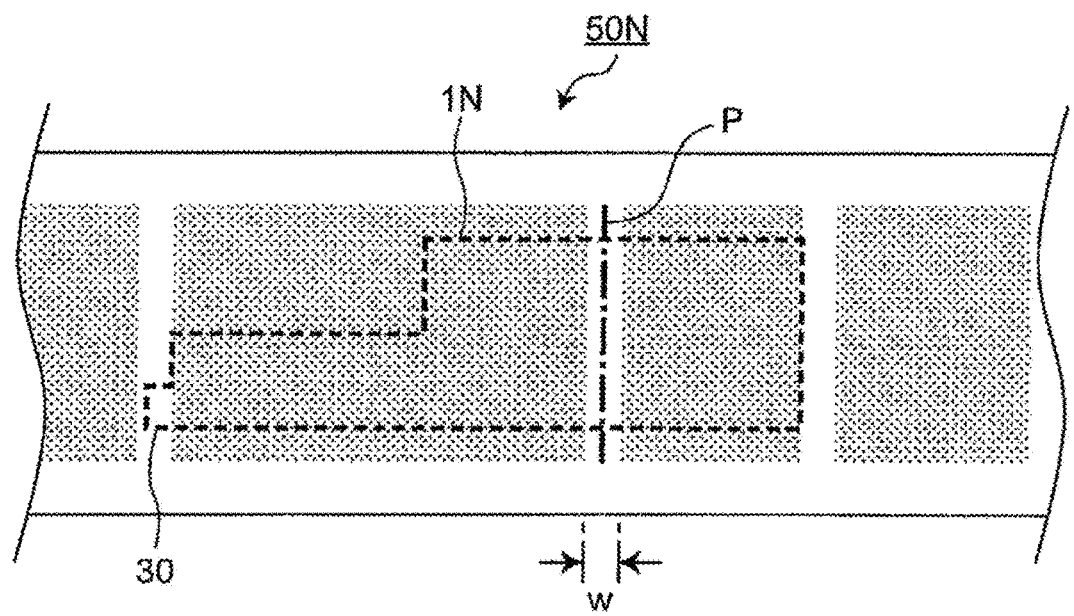
FIG. 15 is a schematic diagram for explaining a method of cutting out an example of the electrode multi-unit from the electrode precursor.

A plan view shape of an electrode multi-unit 1N shown in FIG. 15 is an irregular shape, a plan view shape of one of two electrode material layers is a rectangular shape, and a plan view shape of the other one is an irregular shape. The plan view shape of the two electrode material layers is not linearly symmetric with respect to the alternate long and short dashed line. When only two or more of the electrode multi-units 1N are used as the electrode multi-unit and the positive and negative electrode laminate body in which these are superposed is bent once at an alternate long and short dashed line, the electrode assembly and the secondary battery obtained by using the electrode assembly have an appearance shape including one notch portion in the plan view and one step portion in the side view. Note that the two or more of the electrode multi-units 1N include a positive electrode multi-unit 1N and a negative electrode multi-unit 1N with different collector tab arrangements. One of the positive electrode multi-unit 1N and the negative electrode multi-unit 1N may be similar to the electrode multi-unit 1N of FIG. 15, and the other one may be similar to the electrode multi-unit 1N of FIG. 15 except that the arrangement of the collector tab is different.

In general, between all of the electrode multi-units (positive electrode multi-unit and negative electrode multi-unit) included in the positive and negative electrode laminate body, plan view shapes and dimensions of the electrode multi-units and arrangement, plan view shapes, and dimensions of forming regions and non-forming regions of two or more electrode material layers on the electrode current collector may be common. From the viewpoint of prevention of precipitation of metallic lithium to the negative electrode, dimensions of a forming region of the electrode material layer in the electrode multi-unit and electrode single unit of the negative electrode may be set to be slightly larger than dimensions of a forming region of the electrode material layer in the electrode multi-unit and electrode single unit of the positive electrode.

In the electrode multi-unit, a width w of the non-formed regions 11, 21 to be bent (that is, a distance between two electrode material layers adjacent to each other with the non-forming regions 11, 21 interposed between them) is not particularly limited as long as the electrode assembly can be configured, and may be, for example, 3 mm to 10 mm. In a case where the positive and negative electrode laminate body includes the two or more electrode multi-units, the width w of the two or more electrode multi-units may be set to be larger for arrangement on an outer side when the positive and negative electrode laminate body is bent. In that case, the width may be set within the above range of numerical values. In FIG. 2B, it seems that the width w of the electrode multi-unit is set to be larger for arrangement on an outer side, which is exaggerated merely for the sake of clarity of the drawing, and, in actuality, the width w of all the electrode multi-units is uniform. When the number of the electrode multi-units included in the positive and negative electrode laminate body is 2 to 16, the width w of all the electrode multi-units may be uniform within the above range.

The electrode multi-unit preferably has a collector tab extending from a side not adjacent to the non-forming region to be bent among all sides defining two or more electrode material layers in a plan view shape before being bent. As a result, the collector tab extends from any one of the two or more electrode material layers, and one or more electrode material layers on what is called a downstream side exist. Therefore, the electrode material layer (electrode) on the downstream side is connected via an electrode material layer (electrode) on an upstream side, electric resistance of the battery and the electrode as a whole increases appropriately, and the safety at the time of short circuit is improved. The all sides defining two or more electrode material layers (hereinafter referred to as the all sides Y) in the plan view shape before bending of the electrode multi-unit indicate, for example, sides 22a, 22b, 22c, 22d, 23a, 23b, 23c, and 23d in the electrode multi-unit 2A of FIG. 1B. Among the all sides Y, sides not adjacent to the non-forming region 21 to be bent (hereinafter referred to as the non-adjacent sides Z) are sides 22b, 22c, 22d, 23b, 23c, and 23d.

A collector tab 30, which may be extended from any side of the non-adjacent sides Z, is preferably extended from a side (22c or 23c in FIG. 1B) farthest from a side (22a or 23a in FIG. 1B) adjacent to the non-forming region to be bent among the non-adjacent sides Z, like the electrode multi-units in FIG. 1A (FIG. 3A), FIG. 1B (FIG. 3B), and FIGS. 7 to 15 from the viewpoint of further improving the safety at the time of short circuit. One of the collector tab 30 is normally extended per electrode multi-unit. The collector tab 30 is made from the same material as the electrode current collector, and is extended by being cut out by utilizing the non-forming region of the electrode material layer when the electrode multi-unit is cut out from the above-described electrode precursor.

In a case where the positive and negative electrode laminate body includes two or more positive electrode multi-units, the two or more positive electrode multi-units preferably have the collector tab in the same location in the plan view from the viewpoint of easiness of current collection.

In a case where the positive and negative electrode laminate body includes two or more negative electrode multi-units, the two or more negative electrode multi-units preferably have the collector tab in the same location in the plan view from the viewpoint of easiness of current collection.

In a case where the positive and negative electrode laminate body includes two or more positive electrode multi-units and two or more negative electrode multi-units, the two or more positive electrode multi-units and the two or more negative electrode multi-units preferably have the collector tab in the same location in the plan view for each polarity from the viewpoint of easiness of current collection. That is, preferably, the two or more positive electrode multi-units have collector tabs in the same location in the plan view, the two or more negative electrode multi-units have collector tabs in the same location in the plan view, and the positions of the collector tabs of the two or more positive electrode multi-units and the positions of the collector tabs of the two or more negative electrode multi-units are different. At this time, the positions of the collector tabs of the two or more positive electrode multi-units and the positions of the collector tabs of the two or more negative electrode multi-units, which are on the same side (common side) selected from the non-adjacent sides Z, are more preferably different. Most preferably, the positions of the collector tabs of the two or more positive electrode multi-units and the positions of the collector tabs of the two or more negative electrode multi-units, which are on a side (the same side) farthest from a side adjacent to the non-forming region to be bent, are different.

When the positive and negative electrode laminate body includes an electrode single unit, a collector tab 35 of the electrode single unit is preferably extended in the same location as the collector tab 30 included in the electrode multi-unit 1A having the same polarity as the electrode single unit 1X as shown in FIGS. 2A and 2B.

In the electrode assembly of the present invention, the number of collector tabs can be reduced as compared with a case where the collector tab is formed for each electrode. Therefore, the jointability of the collector tab and the designability of the battery are improved.

Between the electrode multi-units, between the electrode single units, or between the electrode multi-unit and the electrode single unit that are adjacent to each other with the separator interposed between them in the positive and negative electrode laminate body are preferably adhered from the viewpoint of further improving the handleability of the electrode. The adhesion can be performed by using an adhesive separator as a separator, applying an adhesive binder on the electrode material layer, and/or thermocompression bonding.

In each of the electrode multi-units in the electrode assembly, any two electrode material layers adjacent to each other with the bent non-forming region interposed between them have a surface of one of the electrode material layers and a surface of the other one of the electrode material layers forming an angle normally at 0°, and the angle may be 0° to 90°. The angle formed between the surface of one of the electrode material layers and the surface of the other one of the electrode material layers refers to a smaller one of angles formed by the intersection of the two surfaces.

The electrode assembly preferably has the bent non-forming regions 11, 21 on the same one side surface as shown in FIG. 2B, or on two adjacent side surfaces, or more preferably on the same one side surface. The larger the space of the bent non-formed regions 11, 12, the lower the energy density of the battery. For this reason, the electrode assembly more preferably has the bent non-forming regions 11 and 21 on the same side surface. This is because a useless space due to the non-forming region exists only on one side surface, and the space of the non-forming region is minimized, which contributes to improvement of the energy density of the battery.

In the electrode assembly, when an outermost electrode is a positive electrode, from the viewpoint of preventing precipitation of metallic lithium to the negative electrode, the electrode collector of the outermost positive electrode preferably does not have an electrode material layer on an outer side. That is, when the outermost electrode is a positive electrode, an electrode material layer which is in contact with the exterior body is preferably not formed on the electrode collector of the outermost positive electrode. More specifically, in a case where an uppermost electrode in the electrode assembly is a positive electrode, the electrode collector of the uppermost positive electrode does not have an electrode material layer on an upper side, and when a lowermost electrode is a positive electrode, the electrode collector of the lowermost positive electrode preferably does not have an electrode material layer on a lower side. The above similarly applies to a case where the uppermost positive electrode and the lowermost positive electrode are provided by either the electrode multi-unit or the electrode single unit.

In the electrode assembly, an electrode other than the outermost electrode preferably has electrode material layers on both sides of the electrode current collector from the viewpoint of improving the energy density of the battery. The above similarly applies to a case where the electrode other than the outermost positive electrode is provided by either the electrode multi-unit or the electrode single unit.

In a case where the electrode assembly or the secondary battery having an appearance shape including a step portion in a side view, it has been necessary to cut out a plurality of electrodes having different sizes in the conventional technique, and prepare a plurality of cutting molds corresponding to two or more sizes, which has caused increase in cost. However, in the present invention, in a case where, for example, an electrode multi-unit on an innermost side (lowermost layer) in the positive and negative electrode laminate body is a double-sided electrode multi-unit and the positive and negative electrode laminate body includes an electrode single unit, only electrode units of two types of sizes at minimum (one type of electrode multi-unit and one type of electrode single unit) need to be prepared, which contributes to cost reduction. Further, in a case where, for example, an electrode multi-unit on an innermost side (lowermost layer) in the positive and negative electrode laminate body is a single-sided electrode multi-unit and the positive and negative electrode laminate body does not includes an electrode single unit, only an electrode multi-unit of one type of size at minimum needs to be prepared, which further contributes to cost reduction. In these cases, the electrode multi-unit for the positive electrode and the electrode multi-unit for the negative electrode constituting the positive and negative electrode laminate body have the same size and the same shape. Further, in a similar case, the arrangements of the collector tabs can be made different between the electrode multi-unit for the positive electrode and the electrode multi-unit for the negative electrode by taking into consideration the direction of use with respect to the front and back direction, and the like of the electrode multi-unit of one of the polarities (for example, when one type of a metal mold for cutting out the electrode multi-unit of FIGS. 3A, 3B, 5 and 7 to 9 is used). From the viewpoint of improving the energy density of the battery, the former case is preferable. From the viewpoint of cost reduction based on preparation of a cutting mold, the latter case is preferable.

(Constituent Material of Electrode)

The positive electrode multi-unit and the positive electrode single unit are configured with at least a positive electrode material layer and a positive electrode current collector. The positive electrode material layer contains a positive electrode active material as an electrode active material.

The negative electrode multi-unit and the negative electrode single unit are configured with at least a negative electrode material layer and a negative electrode current collector. The negative electrode material layer contains a negative electrode active material as an electrode active material.

The electrode active materials contained in the positive electrode multi-unit, the positive electrode single unit, the negative electrode multi-unit, and the negative electrode single unit, that is, the positive electrode active material and the negative electrode active material are substances directly involved in the transfer of electrons in the secondary battery, and are main substances of the positive and negative electrodes which are responsible for charging and discharging, that is, cell reaction. More specifically, ions are brought in an electrolyte due to "the positive electrode active material" and "the negative electrode active material", and such ions move between the positive electrode and the negative electrode so that electrons are transferred, and charging and discharging are performed. The positive electrode material layer and the negative electrode material layer are preferably layers particularly capable of occluding and releasing lithium ions. That is, the secondary battery is preferably a non-aqueous electrolyte secondary battery, in which lithium ions move between a positive electrode and a negative electrode through a non-aqueous electrolyte to charge and discharge a battery. In a case where lithium ions are involved in charging and discharging, the secondary battery of the present invention corresponds to what is called a "lithium ion battery", and the positive electrode material layer and the negative electrode material layer are layer capable of occluding and releasing lithium ions.

As the positive electrode active material of the positive electrode material layer is made of, for example, a granular body, a binder (which is also referred to as a "binding material") is preferably included in the positive electrode material layer for grains to be in contact with each other more sufficiently and retaining a shape. Furthermore, a conductive auxiliary agent may be included in the positive electrode material layer in order to facilitate transmission of electrons promoting a cell reaction. Likewise, as the negative electrode active material of the negative electrode material layer is made of, for example, a granular body, a binder is preferably included for grains to be in contact with each other sufficiently and retaining a shape, and a conductive auxiliary agent may be included in the negative electrode material layer in order to facilitate transmission of electrons promoting a cell reaction. As described above, since a plurality of components are contained, the positive electrode material layer and the negative electrode material layer can also be referred to as a "positive electrode mixture layer" and a "negative electrode mixture layer", respectively.

The positive electrode active material is preferably a substance that contributes to occlusion and releasing of lithium ions. In this respect, it is preferable that the positive electrode active material be, for example, a lithium-containing composite oxide. More specifically, it is preferable that the positive electrode active material be a lithium transition metal composite oxide containing lithium and at least one kind of transition metal selected from a group consisting of cobalt, nickel, manganese, and iron. That is, in the positive electrode material layer of the secondary battery of the present invention, such a lithium transition metal composite oxide is preferably included as a positive electrode active material. For example, the positive electrode active material may be lithium cobalt oxide, lithium nickel oxide, lithium manganate, lithium iron phosphate, or part of their transition metals replaced with another metal. Although one kind of such a positive electrode active material may be included, two or more kinds of such a positive electrode active material may also be contained in combination. Although it is merely an example, in the secondary battery of the present invention, the positive electrode active material contained in the positive electrode material layer may be lithium cobalt oxide.

The binder which may be contained in the positive electrode material layer is not particularly limited, and can be at least one kind selected from a group consisting of polyvinylidene fluoride, vinylidene fluoride-hexafluoropropylene copolymer, vinylidene fluoride-tetrafluoroethylene copolymer, and polytetrafluoroethylene. The conductive auxiliary agent which may be contained in the positive electrode material layer is not particularly limited, and can be at least one kind selected from carbon black, such as thermal black, furnace black, channel black, ketjen black, acetylene black, and the like, graphite, a carbon fiber, such as carbon nanotube and vapor phase growth carbon fiber, metal powder of copper, nickel, aluminum, silver, and the like, polyphenylene derivative, and the like. For example, the binder of the positive electrode material layer may be polyvinylidene fluoride, and the conductive auxiliary agent of the positive electrode material layer may be carbon black. Although it is merely an example, the binder of the positive electrode material layer and the conductive auxiliary agent may be a combination of polyvinylidene fluoride and carbon black.

The negative electrode active material is preferably a substance that contributes to occlusion and releasing of lithium ions. In this respect, it is preferable that the negative electrode active material be, for example, various carbon materials, oxides or lithium alloys.

As the various carbon materials of the negative electrode active material, graphite (natural graphite, artificial graphite), hard carbon, soft carbon, diamond-like carbon, and the like can be mentioned. In particular, graphite is preferable because it has high electron conductivity and excellent adhesion to a negative electrode current collector. As the oxide of the negative electrode active material, at least one kind selected from a group consisting of silicon oxide, tin oxide, indium oxide, zinc oxide, lithium oxide, and the like can be mentioned. The lithium alloy of the negative electrode active material may be any metal which may be alloyed with lithium, and is preferably, for example, a binary, ternary or higher alloy of a metal, such as Al, Si, Pb, Sn, In, Bi, Ag, Ba, Ca, Hg, Pd, Pt, Te, Zn, La, and the like, and lithium. It is preferable that such an oxide be amorphous as its structural form. This is because degradation due to nonuniformity, such as crystal grain boundaries or defects, is hardly generated. Although it is merely an example, in the secondary battery of the present invention, the negative electrode active material of the negative electrode material layer may be artificial graphite.

The binder which may be contained in the negative electrode material layer is not particularly limited, and can be at least one kind selected from a group consisting of styrene butadiene rubber, polyacrylic acid, polyvinylidene fluoride, polyimide resin, and polyamide imide resin. For example, the binder contained in the negative electrode material layer may be styrene butadiene rubber. The conductive auxiliary agent which may be contained in the negative electrode material layer is not particularly limited, and can be at least one kind selected from carbon black, such as thermal black, furnace black, channel black, ketjen black, acetylene black, and the like, graphite, a carbon fiber, such as carbon nanotube and vapor phase growth carbon fiber, metal powder of copper, nickel, aluminum, silver, and the like, polyphenylene derivative, and the like. Note that the negative electrode material layer may contain a component derived from a thickener component (for example, carboxymethyl cellulose) used at the time of manufacturing a battery.

Although it is merely an example, the negative electrode active material and the binder in the negative electrode material layer may be a combination of artificial graphite and styrene butadiene rubber.

The positive electrode current collector and the negative electrode current collector are members that contribute to collecting and supplying electrons generated in the active material due to a cell reaction. Such a current collector may be a sheet-like metal member and may have a porous or perforated form. For example, the current collector may be a metal foil, a punching metal, a net, an expanded metal, or the like. The positive electrode current collector is preferably made from a metal foil containing at least one selected from a group consisting of aluminum, stainless steel, nickel, and the like, and may be, for example, an aluminum foil. On the other hand, the negative electrode current collector used for the negative electrode is preferably made from a metal foil containing at least one selected from a group consisting of copper, stainless steel, nickel, and the like, and may be, for example, a copper foil. The thicknesses of the positive electrode current collector and the negative electrode current collector are not particularly limited as long as bending of the positive and negative electrode laminate body can be performed, and may be, for example, 3 µm to 30 µm independently of each other.

The maximum thickness of the positive electrode multi-unit, the positive electrode single unit, the negative electrode multi-unit, and the negative electrode single unit (for example, the thickness of a region where the electrode material layer exists on the front and back of the electrode current collector) may be usually 40 µm to 1 mm independently of each other.

The separator is a member provided from the viewpoints of prevention of short circuit caused by contact of the positive and negative electrodes, holding of the electrolyte, and the like. In other words, the separator can be considered as a member that allows ions to pass through while preventing electronic contact between the positive electrode and the negative electrode. Preferably, the separator is a porous or microporous insulating member and has a film form due to its small thickness. Although it is merely an example, a microporous film made from polyolefin may be used as the separator. In this regard, the microporous film used as the separator may contain, for example, only polyethylene (PE) or polypropylene (PP) as polyolefin. Furthermore, the separator may be a laminate body configured with a "microporous film made from PE" and a "microporous film made from PP". A surface of the separator may be covered with an inorganic particle coat layer, an adhesive layer, or the like. The surface of the separator may have adhesive properties. Note that, in the present invention, the separator should not be particularly restricted by its name, and may be a solid electrolyte, a gel electrolyte, an insulating inorganic particle, or the like having a similar function. The thickness of such a separator is preferably 5 µm to 30 µm in consideration of prevention of electronic contact between the positive electrode and the negative electrode and bending.

When the electrode material layer is a layer capable of occluding and releasing lithium ions, the electrolyte is preferably a "non-aqueous" electrolyte, such as an organic electrolyte and an organic solvent (that is, the electrolyte is preferably a non-aqueous electrolyte). In the electrolyte, metal ions released from the electrode (the positive electrode or the negative electrode) exist, and hence the electrolyte helps transfer of metal ions in the cell reaction.

The non-aqueous electrolyte is an electrolyte containing a solvent and a solute. A specific solvent of the non-aqueous electrolyte preferably include at least a carbonate. Such a carbonate may be cyclic carbonates and/or chain carbonates. Although not particularly limited, as the cyclic carbonates, at least one selected from a group consisting of propylene carbonate (PC), ethylene carbonate (EC), butylene carbonate (BC), and vinylene carbonate (VC) can be mentioned. As the chain carbonates, at least one selected from the group consisting of dimethyl carbonate (DMC), diethyl carbonate (DEC), ethyl methyl carbonate (EMC) and dipropyl carbonate (DPC) can be mentioned. Although it is merely an example, a combination of cyclic carbonates and chain carbonates may be used as the non-aqueous electrolyte, and, for example, a mixture of ethylene carbonate and diethyl carbonate is used. As a specific solute of the non-aqueous electrolyte, for example, a Li salt, such as $LiPF_6$ and/or $LiBF_4$, is preferably used.

The exterior body may be a flexible pouch (soft bag) or a hard case (rigid housing), but is preferably a flexible pouch. When the exterior body is a flexible pouch, the flexible pouch is usually formed of a laminate film, and a peripheral portion is heat-sealed to form a seal portion. As the laminate film, a film formed by laminating a metal foil and a polymer film is generally used. Specifically, a three-layer film composed of an outer layer polymer film/a metal foil/an inner layer polymer film is exemplified. The outer layer polymer film is for preventing the metal foil from being damaged due to permeation of moisture and the like, contact, and the like, and polymers, such as polyamide and polyester, can be suitably used. The metal foil is for preventing permeation of moisture and gas, and foil of copper, aluminum, stainless steel, or the like can be suitably used. The inner layer polymer film protects the metal foil from the electrolyte contained in the inside and is for melting and sealing at the time of heat sealing, and polyolefin or acid-modified polyolefin can be suitably used. The thickness of the laminate film is not particularly limited, and is preferably, for example, 1 µm to 1 mm.

When the exterior body is a hard case, the hard case is usually formed of a metal plate, and a peripheral portion is irradiated with laser to form a sealing portion. As the metal plate, a metal material made from aluminum, nickel, iron, copper, stainless steel or the like is generally used. The thickness of the metal plate is not particularly limited, and is preferably, for example, 1 µm to 1 mm.

[Manufacturing Method of Secondary Battery]

The secondary battery of the present invention can be manufactured by a method including at least a manufacturing process of an electrode multi-unit, a manufacturing process of a positive and negative electrode laminate body, and a manufacturing process of an electrode assembly. The manufacturing method of the secondary battery of the present invention usually includes an enclosing step at the end. Hereinafter, each process will be briefly described, and the explanation of the above-described laminated secondary battery can be appropriately referred to.

(Manufacturing Process of Electrode Multi-Unit)

In the present step, the electrode multi-unit is obtained by being cut out from the electrode precursor in which the electrode material layer is formed on the surface of the electrode current collector.

Figure 16:
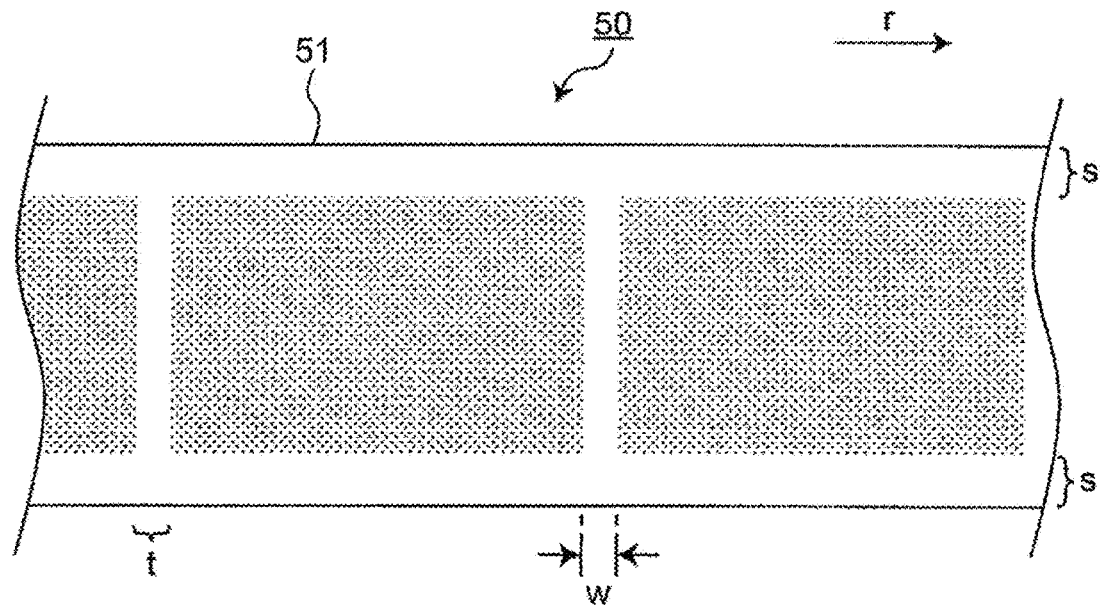
FIG. 16 is a schematic diagram for explaining the electrode precursor.

In the electrode precursor, the electrode material slurry is applied to a metal sheet material (for example, aluminum foil) used as an electrode current collector and rolled by a roll press machine. In this manner, for example, an electrode precursor 50 as shown in FIG. 16 is obtained. The area to be applied is not an entire area of an elongated metal sheet material 51, and, as shown in FIG. 16, an area corresponding to the width w of the non-forming region 21 of the electrode multi-unit described above at least in a longitudinal direction r. Further, the electrode material slurry is not preferably applied to a peripheral region s or the like in both width directions of the metal sheet material 51. Further, in consideration of the arrangement of the collector tabs, for example, as shown in FIG. 16, a region t to which the electrode material slurry is not applied may be provided. FIG. 16 is a schematic diagram for explaining the electrode precursor.

The electrode multi-unit is cut out so that the region where the electrode material slurry is not applied corresponds to the non-forming region 21 of the electrode multi-unit. For example, as shown in FIGS. 3A and 3B, and FIGS. 4 to 15, cutting is performed based on a broken line corresponding to a desired shape. At the time of cutting out, a collector tab may be provided by utilizing a region not applied with the electrode material slurry. The cutting out is merely an example, what is called "punching operation" may be performed.

(Manufacturing Process of Electrode Single Unit)

According to the manufacturing operation of the electrode multi-unit as described above, an electrode single unit can also be obtained. Specifically, the manufacturing method and the manufacturing process of the electrode single unit are the same as the manufacturing method and the manufacturing process of the electrode multi-unit, except that a cut-out shape is different.

(Manufacturing Process of Positive and Negative Electrode Laminate Body)

In this process, desired units selected from the group consisting of the electrode multi-unit and the electrode single unit are laminated and placed on top of each other to obtain a positive and negative electrode laminate body.

Note that the positive and negative electrode laminate body includes at least one electrode multi-unit. As described above, since the positive and negative electrode laminate body includes the electrode multi-unit, the handleability of the positive and negative electrode laminate body is improved.

In the positive and negative electrode laminate body, as described above, the electrode multi-unit and the electrode single unit are arranged such that the positive electrode and the negative electrode are alternately laminated with the separator interposed between them in the electrode assembly. For example, in the positive and negative electrode laminate body, a unit for the positive electrode (the electrode multi-unit or the electrode single unit for the positive electrode) and a unit for the negative electrode (the electrode multi-unit or the electrode single unit for the negative electrode) are alternately laminated with the separator interposed between them. Further, for example, in a case where the positive and negative electrode laminate body includes two or more electrode multi-units, as described above, the two or more electrode multi-units are laminated in such a manner that at least the non-forming regions overlap each other so that the positive and negative electrode laminate body can be bent. The electrode multi-unit and the electrode single unit may be packaged with the separator. As described above, the positive and negative electrode laminate body includes at least the electrode multi-unit, and does not always have to include the electrode single unit. In the present process, in a case where the positive and negative electrode laminate body does not include the electrode single unit, only the electrode multi-unit needs to be laminated, and in a case where the positive and negative electrode laminate body includes the electrode single unit, the electrode multi-unit and the electrode single unit are preferably laminated.

In the present process, as described above, between the electrode multi-units, between the electrode single units, and/or between the electrode multi-unit and electrode single unit that are adjacent to each other with the separator unit interposed between them in the positive and negative electrode laminate body are preferably adhered from the viewpoint of further improving the handleability of the electrode. As described above, the adhesion can be performed by a method using an adhesive separator as the separator, a method of applying an adhesive binder on the electrode material layer, and/or a method of thermocompression bonding.

(Manufacturing Process of Electrode Assembly)

In the present process, for example, the electrode assembly 101A is obtained by bending the positive and negative electrode laminate body in the non-forming regions 11, 21 of the electrode multi-units 1A, 2A as shown in FIG. 2B. As a result, each electrode material layer portion of the electrode multi-units 1A, 2A and the electrode single unit 1X constitutes each electrode.

The electrode assembly can be obtained merely by bending the positive and negative electrode laminate body (that is, the electrode multi-unit and the electrode single unit as desired constituting the positive and negative electrode laminate body), and, as a result, the handleability of the electrode is improved. Further, the manufacturing efficiency of the electrode assembly and the secondary battery is improved.

The number of times of bending may be appropriately determined according to the number of electrode material layers included in one electrode multi-unit.

Normally, after the electrode assembly is obtained by bending the positive and negative electrode laminate body, adhesion is preferably performed so that the state is maintained. The adhesion is preferably performed by adhering the electrode material layers that come into contact with each other only by bending with the separator interposed between them. As the adhesion method, a method similar to a method of adhesion which may be carried out in the manufacturing process of the positive and negative electrode laminate body can be used.

(Enclosing Step)

The secondary battery can be obtained by enclosing the electrode assembly together with the electrolyte in the exterior body. Note that the separator to be laminated may be one that is cut into a sheet, or may be laminated in a meandering shape and an excess portion is cut off.

The laminated secondary battery according to the present invention can be used for devices in various fields in which electricity storage is expected. Although it is merely an example, the laminated secondary battery according to the present invention, in particular, the non-aqueous electrolyte secondary battery, can be used in devices in the fields of electric, information and communications (for example, mobile equipment fields, such as mobile phones, smart phones, smart watches, laptop computers, and digital cameras, and the like) in which mobile equipment is used, home and small industrial applications (for example, electric tools, golf carts, domestic, nursing care, and industrial robot fields), large industrial applications (for example, forklifts, elevators, harbor port crane fields), transportation system fields (for example, fields of hybrid vehicles, electric vehicles, buses, trains, electric assisted bicycles, electric motorcycles, and the like), electric power system applications (for example, fields of various electric power generation, load conditioners, smart grids, general home electric storage systems, and the like), space and deep-sea applications (for example, fields of space explorers, research submarines, and the like), and the like.

DESCRIPTION OF REFERENCE SYMBOLS 1A, 1B, 1C, 1D, 1E, 1F, 1G, 1H, 1J, 1K, 1L, 1M, 1N, 2A: Electrode multi-unit
1X: Electrode single unit
10, 20: Electrode current collector
11, 21: Non-forming region of electrode material layer
12, 13, 22, 23: Electrode material layer
30: Collector tab
50, 50A, 50B, 50C, 50D, 50E, 50F, 50G, 50H, 50J, 50K, 50L, 50M, 50N, 60A: Electrode precursor
51: Electrode current collector
100A: Positive and negative electrode laminate body
101A: Electrode assembly

The invention claimed is:

1. A laminated secondary battery comprising:
an exterior body; and
an electrode assembly and an electrolyte accommodated in the exterior body, wherein the electrode assembly includes: a positive and negative electrode laminate body including an electrode current collector and two or more electrode material layers on the electrode current collector with a non-forming region interposed therebetween, the electrode assembly being bent in the non-forming region to form an electrode multi-unit, wherein the positive and negative electrode laminate body includes one or more of the electrode multi-units and one or more electrode single units having only one second electrode material layer on each of the opposed sides of a second electrode current collector, and in the positive and negative electrode laminate body, the one or more electrode multi-units and the one or more electrode single units are laminated so that a positive electrode and a negative electrode are alternately arranged in the electrode assembly with a separator interposed therebetween, and wherein the secondary battery has a notch portion in a plan view and/or has a step portion in a side view.

2. The laminated secondary battery according to claim 1, wherein
the positive and negative electrode laminate body includes two or more of the electrode multi-units, and
in the positive and negative electrode laminate body, the two or more electrode multi-units are laminated such that a positive electrode and a negative electrode are alternately arranged with a separator interposed therebetween.

3. The laminated secondary battery according to claim 1, wherein the positive and negative electrode laminate body includes one or more first electrode multi-units of the electrode multi-units configured as a positive electrode and one or more second electrode multi-units of the electrode multi-units configured as a negative electrode.

4. The laminated secondary battery according to claim 3, wherein the one or more first electrode multi-units and the one or more second electrode multi-units are laminated so that at least the non-forming regions of each overlap with each other.

5. The laminated secondary battery according to claim 1, wherein the electrode multi-unit has a collector tab extending from a side not adjacent to the non-forming region among all sides defining the two or more electrode material layers in a plan view thereof before being bent.

6. The laminated secondary battery according to claim 5, wherein the positive and negative electrode laminate body includes two or more first electrode multi-units of the electrode multi-units configured as a positive electrode and two or more second electrode multi-units of the electrode multi-units configured as a negative electrode, the two or more first electrode multi-units and the two or more second electrode multi-units having the collector tab in a same location in the plan view.

7. The laminated secondary battery according to claim 1, wherein the two or more electrode material layers of the electrode multi-unit independently have a rectangular shape or an irregular shape in a plan view of the electrode current collector.

8. The laminated secondary battery according to claim 1, wherein in each of the electrode multi-units in the electrode assembly, a first surface of a first of the electrode material layers and a second surface of a second of the electrode material layers of any two electrode material layers adjacent to each other with the bent non-forming region interposed between them form an angle of 0° to 90°.

9. The laminated secondary battery according to claim 1, wherein in the electrode assembly, when an outermost electrode is a positive electrode, the electrode current collector of this outermost positive electrode does not have an electrode material layer on an outer side thereof.

10. The laminated secondary battery according to claim 1, wherein in the electrode assembly, an electrode other than an outermost electrode has electrode material layers on both sides of the electrode current collector.

11. The laminated secondary battery according to claim 1, wherein the exterior body is a flexible pouch or a hard case.

12. The laminated secondary battery according to claim 1, wherein the electrode material layer is a layer capable of occluding and releasing a lithium ion.

13. A device comprising the laminated secondary battery according to claim 1.

14. The device according to claim 13, wherein the device is a mobile device.

* * * * *